US011091121B2

(12) United States Patent
Yamamoto

(10) Patent No.: US 11,091,121 B2
(45) Date of Patent: Aug. 17, 2021

(54) WEBBING TAKE-UP DEVICE

(71) Applicant: TOYOTA JIDOSHA KABUSHIKI KAISHA, Toyota (JP)

(72) Inventor: Kazuhito Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 113 days.

(21) Appl. No.: 16/412,602

(22) Filed: May 15, 2019

(65) Prior Publication Data

US 2020/0023809 A1    Jan. 23, 2020

(30) Foreign Application Priority Data

Jul. 23, 2018 (JP) .............................. JP2018-137501
Oct. 30, 2018 (JP) .............................. JP2018-203594

(51) Int. Cl.
   B60R 22/38    (2006.01)
(52) U.S. Cl.
   CPC .................................. B60R 22/38 (2013.01)
(58) Field of Classification Search
   CPC ......... B60R 22/36; B60R 22/38; B60R 22/44; B60R 22/46; B60R 22/343; B60R 2022/4473
   See application file for complete search history.

(56) References Cited

U.S. PATENT DOCUMENTS

| 4,036,322 A | 7/1977 | Takada et al. | |
| 4,187,925 A * | 2/1980 | Lindblad | B60R 22/46 |
| | | | 180/268 |
| 5,538,098 A * | 7/1996 | Sparhawk | B60R 22/343 |
| | | | 180/270 |
| 2001/0030255 A1 | 10/2001 | Peter | |
| 2002/0096591 A1 | 7/2002 | Tanji | |
| 2004/0195420 A1 | 10/2004 | Schnabl | |
| 2005/0178870 A1 * | 8/2005 | Loffler | B60R 22/405 |
| | | | 242/374 |

FOREIGN PATENT DOCUMENTS

| EP | 0460494 A1 | 12/1991 |
| JP | 2002-2447 A | 1/2002 |
| JP | 2002-220028 A | 8/2002 |
| JP | 2004-262448 A | 9/2004 |
| JP | 2008-114771 A | 5/2008 |
| JP | 4521798 B2 | 8/2010 |
| JP | 3189448 U | 3/2014 |

* cited by examiner

*Primary Examiner* — Sang K Kim
(74) *Attorney, Agent, or Firm* — Oliff PLC

(57) ABSTRACT

The rotatable locking section engages with the fixed locking section resulting in pull-out direction rotation of the spool being locked. The webbing take-up device includes a permanent magnet and an electromagnet that restrict displacement of the rotatable locking section toward the fixed locking section, and that are actuated in a vehicle emergency so as to displace the rotatable locking section toward the fixed locking section. A restricting force of the rotatable locking section by the permanent magnet and the electromagnet is set such that the rotatable locking section is displaced toward the fixed locking section by an inertial force that spins the rotatable locking section about its own center of rotation when the electromagnet is deactivated and the spool has been rotated in the pull-out direction with an angular acceleration greater than a predetermined angular acceleration.

12 Claims, 19 Drawing Sheets

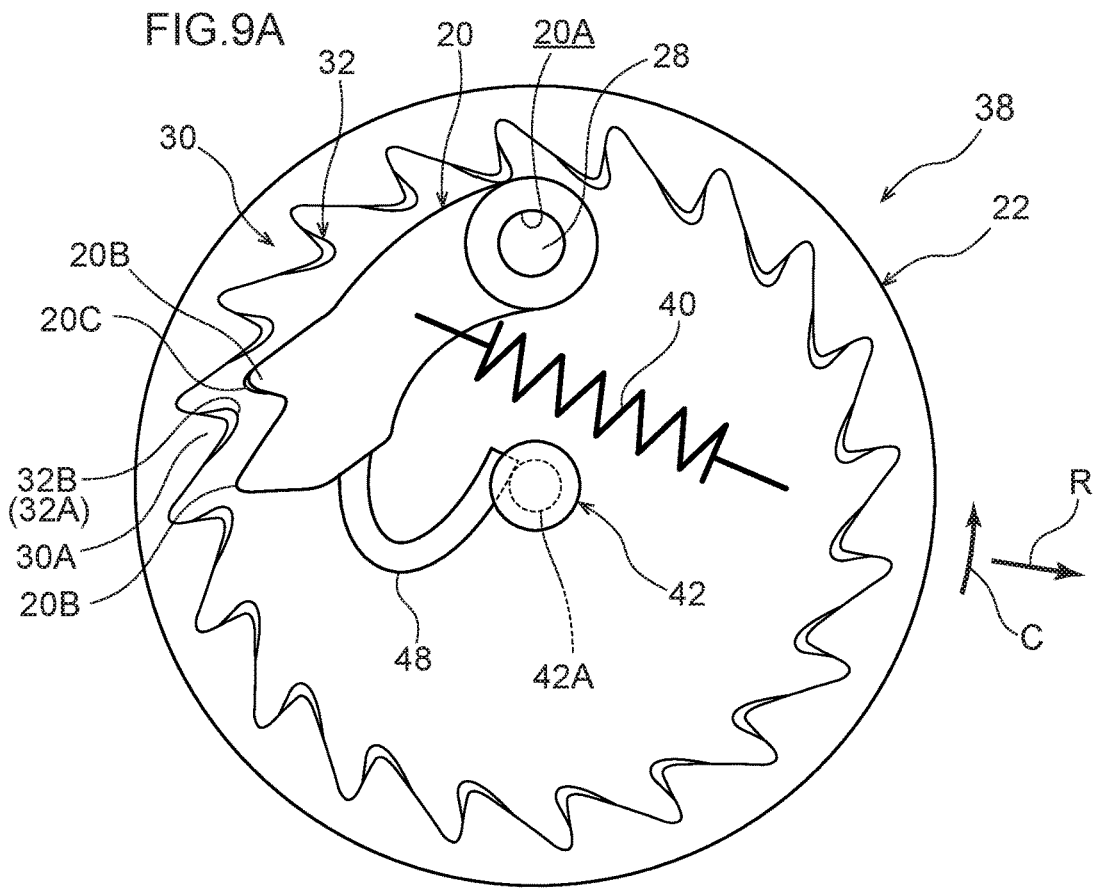
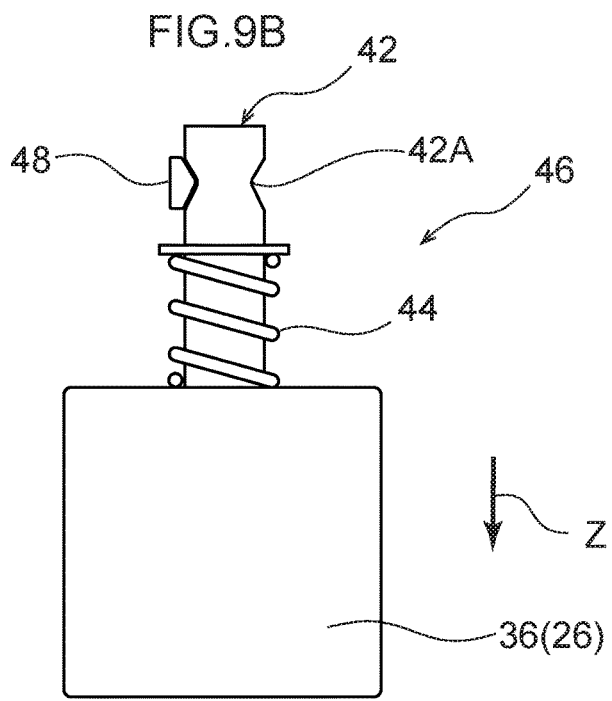

WEBBING TAKE-UP DEVICE

CROSS-REFERENCE TO RELATED APPLICATIONS

This application is based on and claims priority under 35 USC 119 from Japanese Patent Application Nos. 2018-137501 filed on Jul. 23, 2018, and 2018-203594 filed on Oct. 30, 2018, the disclosures of which are incorporated by reference herein.

BACKGROUND

Technical Field

The present invention relates to a webbing take-up device.

Related Art

Japanese Patent Application Laid-Open (JP-A) No. 2002-2447 (Patent Document 1) discloses a webbing take-up device including a spool on which a webbing (belt) is taken up, a gear member that rotates as a unit together with the spool, and an anchoring claw provided so as to be capable of engaging with the gear member. When a flow of current to a solenoid is shut off, the anchoring claw is displaced such that the anchoring claw engages with the gear member, thus locking rotation of the spool (rotation in a pull-out direction of the webbing from the spool).

JP-A No. 2002-220028 (Patent Document 2) discloses a webbing take-up device including a first locking unit and a second locking unit that lock rotation of a spool (rotation in a pull-out direction of a webbing from the spool) when required in a vehicle emergency or the like.

In the webbing take-up device disclosed in Patent Document 2, the second locking unit actuates if the first locking unit fails to actuate due to a fault such as a poor terminal connection or damage to a circuit component. Rotation of the spool can thus be locked even if the first locking unit fails to actuate.

In the configuration disclosed in Patent Document 1, in a state in which current does not flow to the solenoid due to an electrical system fault or the like, rotation of the spool is locked, which could for example prevent subsequent wearing of the belt.

In the configuration disclosed in Patent Document 2, even if the first locking unit fails to actuate, rotation of the spool can be locked by the second locking unit. However, since it is necessary to provide both the first locking unit and the second locking unit, there is room for improvement from the perspective of reducing the physical size of the webbing take-up device and reducing the number of configuration components.

The mechanisms for locking spool rotation disclosed in Patent Documents 1 and 2 envisage repeated actuation due to continued use of the vehicle. Improving the durability of a mechanism for locking spool rotation is therefore an important issue.

SUMMARY

In consideration of the above circumstances, out of the issue of suppressing unwanted locking of spool rotation, the issue of achieving a smaller physical size, the issue of reducing the number of configuration components, the issue of improving the durability of a mechanism for locking spool rotation, an object of the present invention is to address at least the issue of suppressing unwanted locking of spool rotation.

Solution to Problem

A webbing take-up device of a first aspect of the present invention includes a spool that takes up a webbing worn by an occupant and that is rotated in a pull-out direction by the webbing being pulled out, a rotatable locking section that is provided so as to be rotatable as a unit together with the spool and so as to be displaceable in a rotation-radial direction of the spool, a fixed locking section that is provided at an outer side of the rotatable locking section in the rotation-radial direction of the spool, and that the rotatable locking section engages with resulting in pull-out direction rotation of the spool being locked, a restricting section that restricts displacement of the rotatable locking section toward the fixed locking section, and a displacement section that is actuated in a vehicle emergency so as to displace the rotatable locking section toward the fixed locking section against the restriction of displacement of the rotatable locking section by the restricting section. A restricting force of the rotatable locking section by the restricting section is set such that the rotatable locking section is displaced toward the fixed locking section by an inertial force that spins the rotatable locking section about its own center of rotation when the displacement section is deactivated and the spool has been rotated in the pull-out direction with an angular acceleration greater than a predetermined angular acceleration.

In the webbing take-up device of the first aspect, an occupant puts on the webbing by pulling out the webbing from the spool. When the displacement section is actuated in a vehicle emergency, the rotatable locking section is displaced toward the fixed locking section against the restriction on displacement by the restricting section, and engages with the fixed locking section. Pull-out direction rotation of the spool is thereby locked, and pull-out of the webbing from the spool is restricted.

Note that the rotatable locking section is displaced toward the fixed locking section by an inertial force that spins the rotatable locking section about its own center of rotation when the displacement section is deactivated and the spool has been rotated in the pull-out direction with an angular acceleration greater than the predetermined angular acceleration. Namely, the rotatable locking section is displaced toward the fixed locking section against the restriction on displacement by the restricting section, and engages with the fixed locking section. Pull-out direction rotation of the spool is thereby locked, and pull-out of the webbing from the spool is restricted. Thus, when the spool is rotated in the pull-out direction with an angular acceleration greater than the predetermined angular acceleration, namely, when the webbing has been pulled out sharply from the spool as might be envisaged in a vehicle emergency, pull-out direction rotation of the spool can be locked and pull-out of the webbing from the spool can be restricted, even if the displacement section has not been actuated.

Note that in a normal state that is not a vehicle emergency, displacement of the rotatable locking section toward the fixed locking section is restricted by the restricting section. Unwanted engagement of the rotatable locking section with the fixed locking section is thereby suppressed, enabling unwanted locking of rotation of the spool to be suppressed.

A webbing take-up device of a second aspect of the present invention is the webbing take-up device of the first aspect, wherein the restricting section and the displacement section include a permanent magnet fixed to the rotatable locking section, and an electromagnet formed from a magnetic material and including a core disposed opposite the permanent magnet and a coil disposed around the core. Displacement of the rotatable locking section toward the fixed locking section is restricted by a magnetic force of the permanent magnet attracting the core, and the rotatable locking section is displaced toward the fixed locking section by a current being passed through the coil in one direction such that a magnetic force of repulsion from the permanent magnet is generated in the core.

In the webbing take-up device of the second aspect, a magnetic force of repulsion from the permanent magnet is generated in the core when a current is passed through the coil in the one direction in a vehicle emergency. The rotatable locking section to which the permanent magnet is fixed is thereby displaced toward the fixed locking section, and engages with the fixed locking section. Pull-out direction rotation of the spool is thereby locked, and pull-out of the webbing from the spool is restricted.

Moreover, the rotatable locking section is displaced toward the fixed locking section by an inertial force that spins the rotatable locking section about its own center of rotation when the electromagnet is deactivated and the spool has been rotated in the pull-out direction with an angular acceleration greater than the predetermined angular acceleration. Namely, the rotatable locking section is displaced toward the fixed locking section and engages with the fixed locking section against the magnetic force of the permanent magnet attracting the core. Pull-out direction rotation of the spool is thereby locked, and pull-out of the webbing from the spool is restricted.

Note that in a normal state that is not a vehicle emergency, displacement of the rotatable locking section toward the fixed locking section is restricted by the magnetic force of the permanent magnet attracting the core. Unwanted engagement of the rotatable locking section with the fixed locking section is thereby suppressed, enabling unwanted locking of rotation of the spool to be suppressed.

A webbing take-up device of a third aspect of the present invention is the webbing take-up device of the second aspect, wherein displacement of the rotatable locking section toward the fixed locking section is restricted by a current being passed through the coil in another direction such that a magnetic force pulling on the permanent magnet is generated in the core.

In the webbing take-up device of the third aspect, the magnetic force pulling on the permanent magnet is generated in the core when a current is passed through the coil in the other direction. This enables displacement of the rotatable locking section toward the fixed locking section to be more firmly restricted than in cases in which current is not passed through the coil in the other direction.

A webbing take-up device of a fourth aspect of the present invention is the webbing take-up device of the third aspect, wherein current is passed through the coil in the other direction when the webbing is being pulled out from the spool as an occupant attempts to put on the webbing, and current stops being passed through the coil in a state in which the webbing is being worn by the occupant.

In the webbing take-up device of the fourth aspect, current is passed through the coil in the other direction when an occupant pulls out the webbing from the spool. This enables displacement of the rotatable locking section toward the fixed locking section to be even more firmly restricted. This enables the occupant to quickly pull out the webbing from the spool, and to quickly put on the webbing.

Moreover, current stops being passed through the coil in a state in which the webbing is being worn by the occupant. This enables power consumption due to current being passed through the coil to be suppressed.

A webbing take-up device of a fifth aspect of the present invention is the webbing take-up device of any one of the second aspect to the fourth aspect, wherein the core includes a shaft upper portion disposed on a rotation axis of the spool and is provided so as to be capable of rotating as a unit with the spool, and the coil is disposed around the shaft upper portion.

In the webbing take-up device of the fifth aspect, the shaft upper portion of the core that rotates as a unit with the spool is disposed on the rotation axis of the spool, and the coil is disposed around the shaft upper portion of the core. This enables the wiring route to the coil to be suppressed from becoming complex. As a result, the configuration of the webbing take-up device can also be suppressed from becoming complex. Moreover, the number of configuration components of the webbing take-up device can be reduced due to having a configuration in which the coil does not rotate together with the spool.

A webbing take-up device of a sixth aspect of the present invention is the webbing take-up device of any one of the second aspect to the fifth aspect, wherein the rotatable locking section is displaced as far as a position where the rotatable locking section is capable of abutting the fixed locking section when current is being passed through the coil in the one direction. Engagement of the rotatable locking section and the fixed locking section with each other is completed by the spool being rotated in the pull-out direction in an abutted state of the rotatable locking section against the fixed locking section.

In the webbing take-up device of the sixth aspect, the rotatable locking section is displaced as far as a position where the rotatable locking section is capable of abutting the fixed locking section when current is passed through the coil of the electromagnet in the one direction. The engagement of the rotatable locking section and the fixed locking section with each other is completed by the spool being rotated in the pull-out direction in the abutted state of the rotatable locking section against the fixed locking section. Thus, the electromagnet does not displace the rotatable locking section as far as a position where engagement of the rotatable locking section and the fixed locking section is completed, thereby enabling an increase in the physical size of the electromagnet (a higher electromagnet output) to be suppressed. This enables the physical size of the webbing take-up device to be made smaller as a result.

A webbing take-up device of a seventh aspect of the present invention is the webbing take-up device of any one of the first aspect to the sixth aspect, wherein the fixed locking section includes a leading end portion that abuts the rotatable locking section at a rotation-radial direction inner side portion of the spool and a terminal portion that abuts the rotatable locking section at a rotation-radial direction outer side portion of the spool. A hardness of the leading end portion is lower than a hardness of the terminal portion.

In the webbing take-up device of the seventh aspect, when the displacement section is actuated and the rotatable locking section is displaced toward the fixed locking section, the rotatable locking section abuts the terminal portion of the fixed locking section after having abutted the leading end portion thereof. Note that the hardness of the leading end portion of the fixed locking section is lower than the hardness of the terminal portion thereof. This enables the initial impact when the rotatable locking section engages with the fixed locking section to be lessened. Damage to the rotatable locking section and the fixed locking section is suppressed as a result, enabling the durability of the mechanism for locking rotation of the spool to be improved.

A webbing take-up device of an eighth aspect of the present invention is the webbing take-up device of the seventh aspect, wherein the fixed locking section includes a first fixed locking section and a second fixed locking section adjacent to each other in a rotation axis direction of the spool. The terminal portion is provided at the first fixed locking section, and the leading end portion is provided at the second fixed locking section.

In the webbing take-up device of the eighth aspect, selecting the materials used for the first fixed locking section and the second fixed locking section of the fixed locking section enables the hardness of the leading end portion and the hardness of the terminal portion of the fixed locking section to be easily set.

A webbing take-up device of a ninth aspect of the present invention is the webbing take-up device of the first aspect, wherein the restricting section includes a biasing member that biases the rotatable locking section toward an opposite side from the fixed locking section, and the displacement section includes an electromagnet including a coil and a moving member that moves when a current is passed through the coil. A current being passed through the coil in one direction moves the moving member such that the rotatable locking section is pressed directly or indirectly by the moving member and the rotatable locking section is displaced toward the fixed locking section.

In the webbing take-up device of the ninth aspect, the moving member moves when a current is passed through the coil in the one direction in a vehicle emergency. When the moving member moves, the moving member directly or indirectly presses the rotatable locking section. The rotatable locking section is thereby displaced toward the fixed locking section and engages with the fixed locking section. Pull-out direction rotation of the spool is thereby locked, and pull-out of the webbing from the spool is restricted.

The rotatable locking section is displaced toward the fixed locking section by an inertial force that spins the rotatable locking section about its own center of rotation when the electromagnet is deactivated and the spool has been rotated in the pull-out direction with an angular acceleration greater than the predetermined angular acceleration. Namely, the rotatable locking section is displaced toward the fixed locking section against the biasing force of the biasing member, and engages with the fixed locking section. Pull-out direction rotation of the spool is thereby locked, and pull-out of the webbing from the spool is restricted.

Note that in a normal state that is not a vehicle emergency, displacement of the rotatable locking section toward the fixed locking section is restricted by the biasing force of the biasing member. Unwanted engagement of the rotatable locking section with the fixed locking section is thereby suppressed, enabling unwanted locking of rotation of the spool to be suppressed.

A webbing take-up device of a tenth aspect of the present invention is the webbing take-up device of any one of the first aspect to the ninth aspect, wherein the rotatable locking section includes a first rotatable locking section and a second rotatable locking section disposed adjacent to the first rotatable locking section in a rotation axis direction of the spool. The second rotatable locking section is displaceable toward the outer side with respect to the first rotatable locking section in a rotation-radial direction of the spool. The second rotatable locking section is displaced toward the outer side with respect to the first rotatable locking section in a rotation-radial direction of the spool, and the second rotatable locking section engages with the fixed locking section before the first rotatable locking section engages with the fixed locking section.

In the webbing take-up device of the tenth aspect, the second rotatable locking section is displaced toward the outer side with respect to the first rotatable locking section in the rotation-radial direction of the spool, and the second rotatable locking section engages with the fixed locking section before the first rotatable locking section engages with the fixed locking section. Accordingly, the impact when the rotatable locking section (the first rotatable locking section and the second rotatable locking section) engages with the fixed locking section can be dispersed between the first rotatable locking section and the second rotatable locking section.

The webbing take-up device according to the present invention exhibits an excellent advantageous effect of enabling unwanted locking of spool rotation to be suppressed.

BRIEF DESCRIPTION OF THE DRAWINGS

Exemplary embodiments will be described in detail based on the following figures, wherein:

FIG. 9A is a side view illustrating another locking mechanism prior to actuation of an electromagnet;

FIG. 9B is a plan view illustrating a relationship between an electromagnet and a load transmission section;

DETAILED DESCRIPTION

Figure 1:
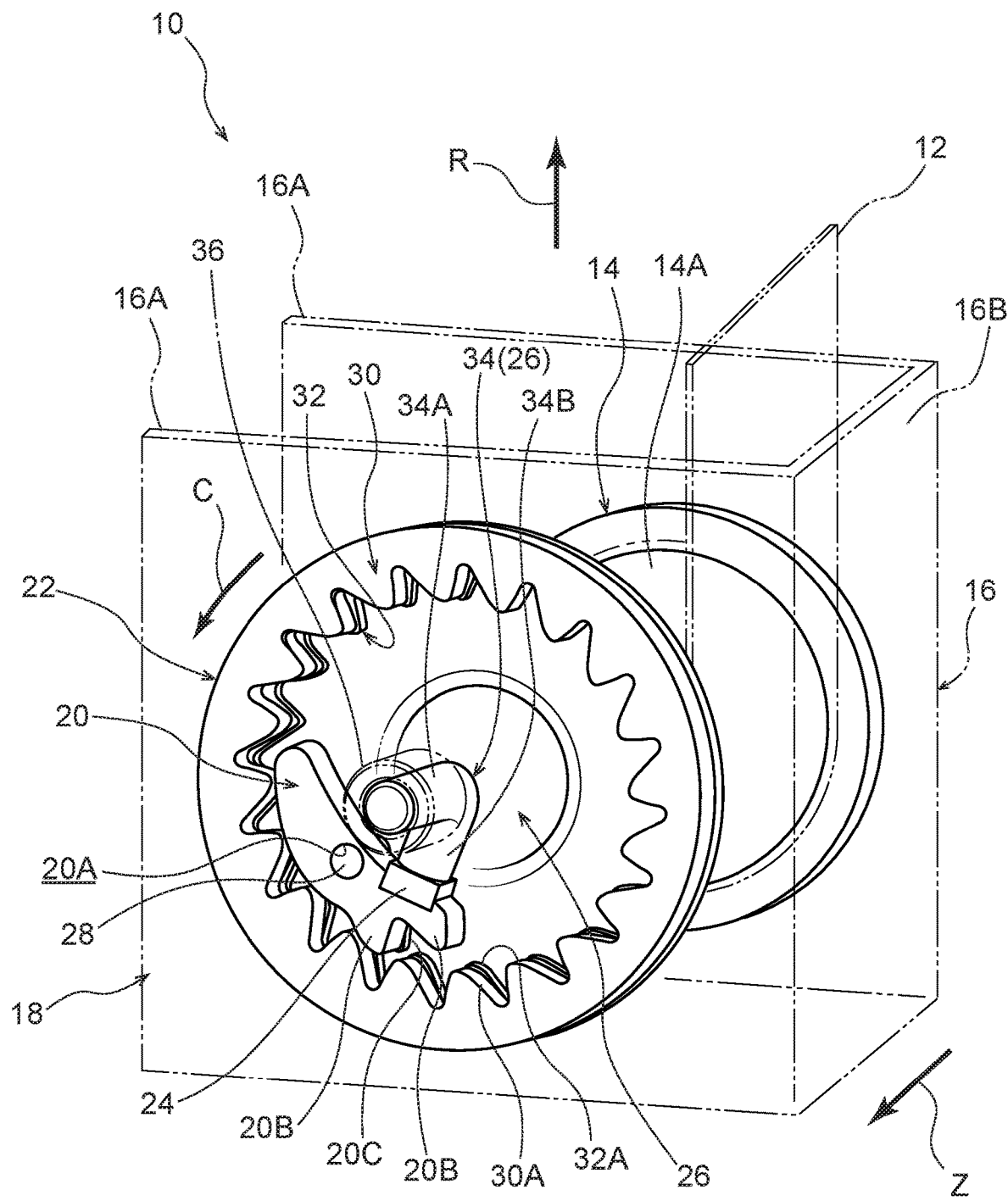
FIG. 1 is a perspective view illustrating relevant portions of a webbing take-up device of an exemplary embodiment.

Explanation follows regarding a webbing take-up device according to an exemplary embodiment of the present invention, with reference to FIG. 1 to FIG. 8. In the drawings, the arrow Z direction, the arrow R direction, and the arrow C direction respectively correspond to a rotation axis direction, a rotation-radial direction, and a rotation-circumferential direction of a spool as appropriate. In the following explanation, unless specifically stated otherwise, reference simply to the axial direction, radial direction, and circumferential direction are understood to refer to the rotation axis direction, the rotation-radial direction, and the rotation-circumferential direction of the spool.

As illustrated in FIG. 1, a webbing take-up device 10 of the present exemplary embodiment includes a spool 14 on which a webbing 12 worn by an occupant is taken up, a frame 16 that is fixed to a vehicle body or a vehicle seat, and a locking mechanism 18 that locks pull-out direction (arrow C direction) rotation of the spool 14 in a vehicle emergency.

The spool 14 includes a take-up section 14A on which the webbing is taken up.

When the spool 14 is rotated in a take-up direction (the opposite direction to the arrow C) by a biasing force of a spring, not illustrated in the drawings, the webbing 12 is taken up on the take-up section 14A of the spool 14. Moreover, the spool 14 is rotated in the pull-out direction when the webbing 12 is pulled out from the spool 14.

The frame 16 includes a pair of side walls 16A disposed spaced apart from each other in the axial direction, and a base wall 16B that links together end portions on one side of the pair of side walls 16A. The spool 14 is disposed between the pair of side walls 16A. The base wall 16B is fixed to the vehicle body or the vehicle seat, thus fixing the webbing take-up device 10 to the vehicle body or the vehicle seat.

The locking mechanism 18 includes a rotatable locking section 20 provided so as to be capable of rotating as a unit together with the spool 14 and provided so as to be capable of tilting (displaceable) in the rotation-radial direction of the spool 14, and a fixed locking section 22 that the rotatable locking section 20 engages with in order to lock pull-out direction rotation of the spool 14. The locking mechanism 18 further includes a permanent magnet 24 serving as a restricting section and a displacement section fixed to the rotatable locking section 20, and an electromagnet 26 serving as a restricting section and a displacement section that, when actuated, either causes the rotatable locking section 20 to tilt, or limits tilting of the rotatable locking section 20.

Figure 2:
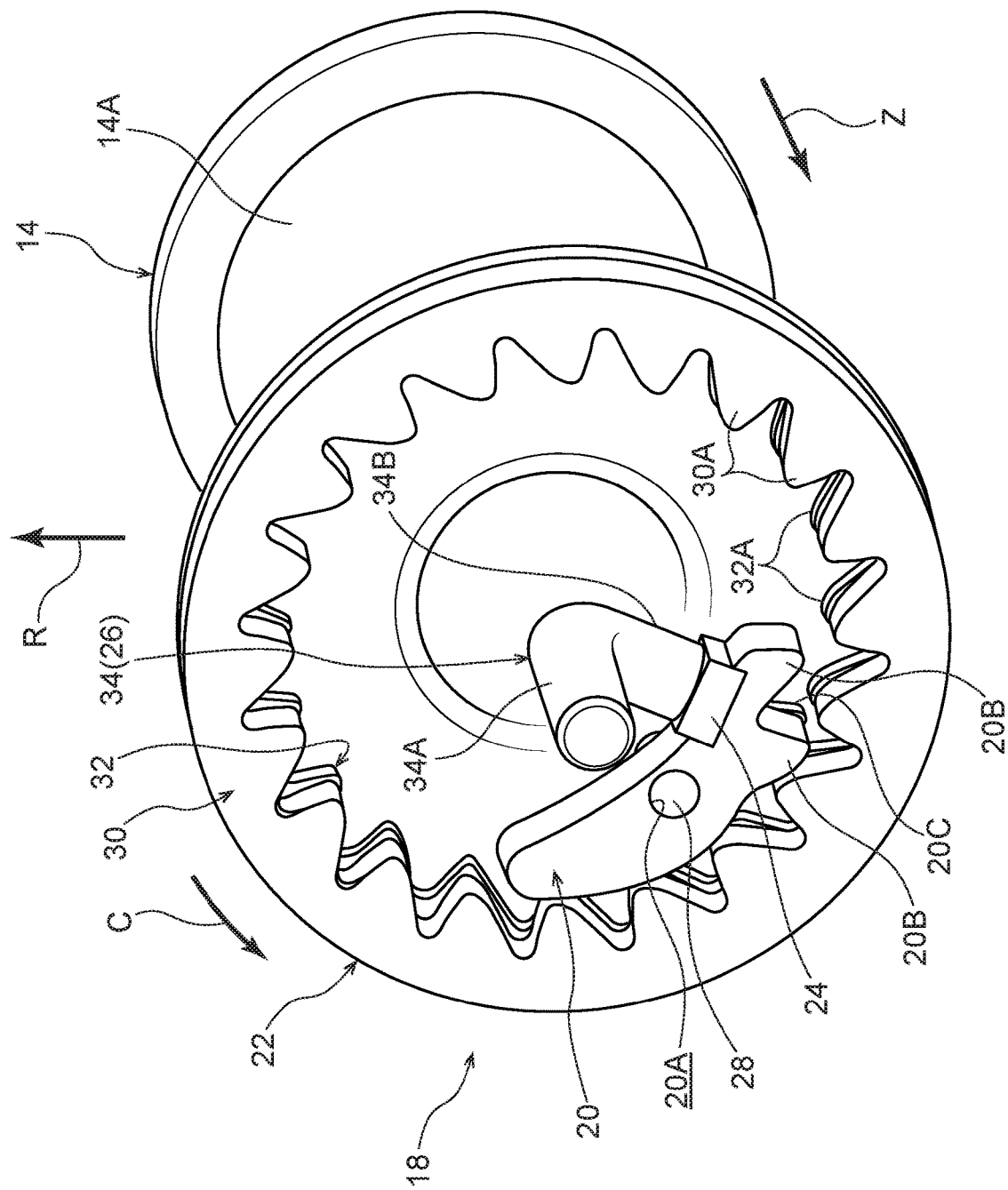
FIG. 2 is an enlarged perspective view illustrating a locking mechanism of a webbing take-up device of an exemplary embodiment.

As illustrated in FIG. 2, the rotatable locking section 20 is formed from a metal material. The rotatable locking section 20 is formed in a substantially half-moon shape as viewed along the axial direction. A circular support hole 20A is formed penetrating a central portion, including the center of gravity, of the rotatable locking section 20 in the axial direction. The rotatable locking section 20 is fixed to one axial direction side end portion of the spool 14 at a portion at the radial direction outer side of the rotation axis (center of rotation) of the spool 14 through a support pin 28 inserted through the support hole 20A. Two main engaging teeth 20B that engage with the fixed locking section 22, described later, are formed to an outer peripheral portion of one circumferential direction side (pull-out direction side) end portion of the rotatable locking section 20. The main engaging tooth 20B on the side closer to the support pin 28 is formed with a sub engaging tooth 20C on the other axial direction side (the opposite side to the arrow Z). A portion on one circumferential direction side of the sub engaging tooth 20C projects toward the one circumferential direction side with respect to the main engaging tooth 20B on the side closer to the support pin 28. In the present exemplary embodiment, the thickness (axial direction dimension) of the main engaging teeth 20B is set thicker than the thickness (axial direction dimension) of the sub engaging tooth 20C. Moreover, the rectangular block shaped permanent magnet 24 is fixed to an inner peripheral portion of an end portion on the one circumferential direction side (pull-out direction side) of the rotatable locking section 20.

The fixed locking section 22 is configured including a first fixed locking section 30 and a second fixed locking section 32 disposed adjacent to each other in the rotation axis direction of the spool 14. The first fixed locking section 30 and the second fixed locking section 32 are fixed to the side wall 16A (see FIG. 1) or the like of the frame in a state disposed at the radial direction outer side of the rotatable locking section 20.

The first fixed locking section 30 is formed from a metal material, similarly to the rotatable locking section 20. The first fixed locking section 30 is formed in a ring shape disposed coaxially with the rotation axis of the spool 14. Plural main engagement teeth 30A that the main engaging teeth 20B of the rotatable locking section 20 engage with are formed at an inner peripheral portion of the first fixed locking section 30. The plural main engagement teeth 30A are disposed at uniform spacings around the circumferential direction.

The second fixed locking section 32 is disposed on the other axial direction side of the first fixed locking section 30. The second fixed locking section 32 is formed from a resin material having lower hardness than the metal material forming the first fixed locking section 30 and the rotatable locking section 20, and is formed in a ring shape and disposed coaxially with the rotation axis of the spool 14. Plural sub engagement teeth 32A that the sub engaging tooth 20C of the rotatable locking section 20 engages with are formed at an inner peripheral portion of the second fixed locking section 32. The plural sub engagement teeth 32A are disposed at uniform spacings around the circumferential direction. In the present exemplary embodiment, the thickness (axial direction dimension) of the main engagement teeth 30A is set thicker than the thickness (axial direction dimension) of the sub engagement teeth 32A.

Figure 3:
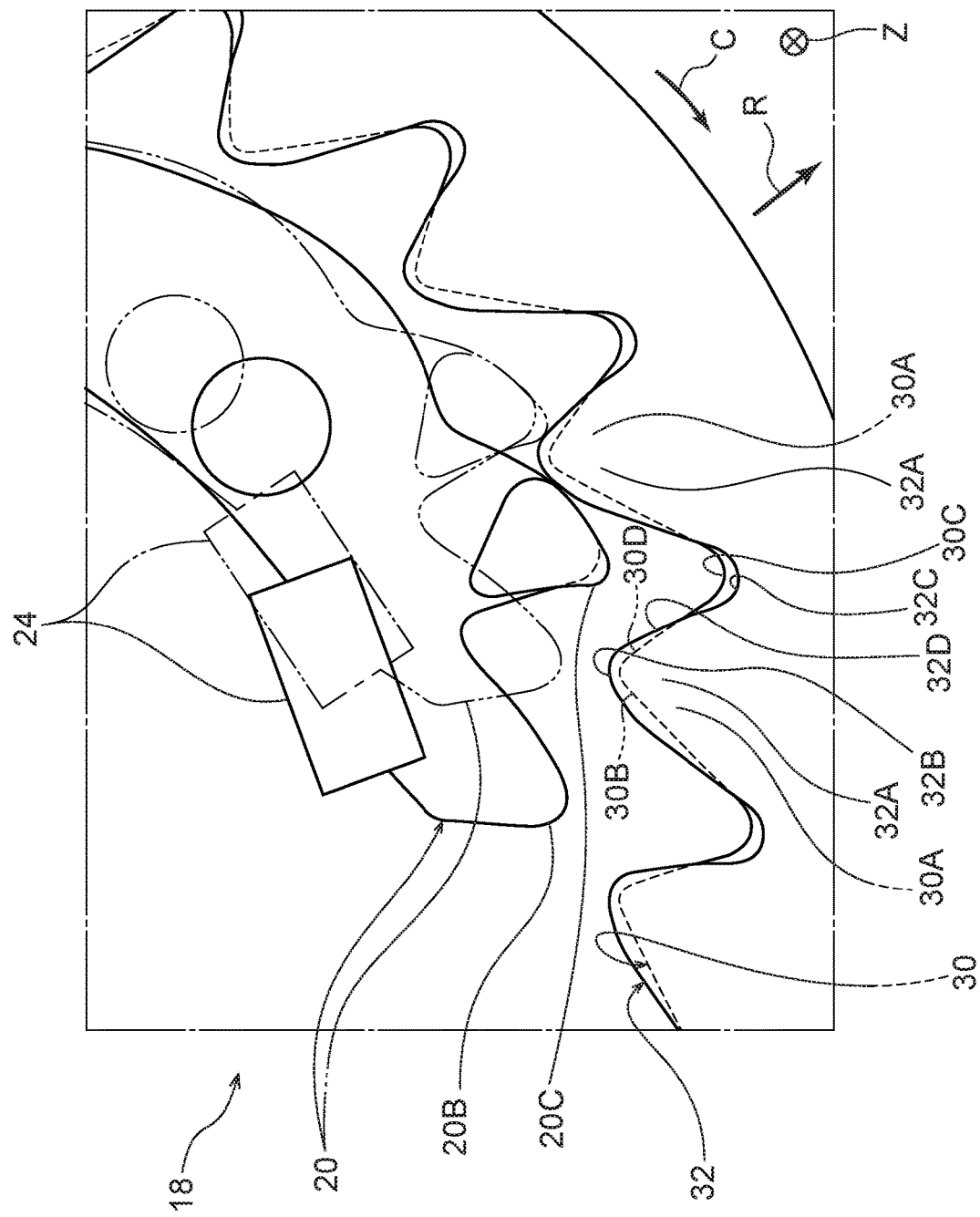
FIG. 3 is a side view illustrating a state in which a rotatable locking section has been tilted by actuating an electromagnet so as to abut a fixed locking section.

As illustrated in FIG. 3, as viewed along the axial direction, a leading end portion 32B of each of the sub engagement teeth 32A of the second fixed locking section 32 projects further toward the radial direction inside than a leading end portion 30B of each of the main engagement teeth 30A of the first fixed locking section 30. Moreover, another circumferential direction side face 32D of the leading end portion 32B of each of the sub engagement teeth 32A of the second fixed locking section 32 is positioned further toward the other circumferential direction side than another circumferential direction side face 30D of the leading end portion 30B of each of the main engagement teeth 30A of the first fixed locking section 30. A terminal portion 32C (located between adjacent sub engagement teeth 32A in the circumferential direction) of each of the sub engagement teeth 32A of the second fixed locking section 32 is indented further toward the radial direction outer side than a terminal portion 30C (located between adjacent main engagement teeth 30A in the circumferential direction) of each of the main engagement teeth 30A of the first fixed locking section 30.

As illustrated in FIG. 1, the electromagnet 26 is configured including a core 34 formed from a magnetic material, and a coil 36 disposed around the core 34.

The core 34 is formed by bending a rod-shaped member with a circular cross-section into an L-shape, and is attached to the spool 14 so as to be capable of rotating as a unit together with the spool 14 through a support member, not illustrated in the drawings. The core 34 includes a shaft upper portion 34A disposed on the rotation axis of the spool 14, and an opposing portion 34B that is bent at a spool 14-side end portion of the shaft upper portion 34A and extends toward the radial direction outer side. A radial direction outer side face of the opposing portion 34B opposes the permanent magnet 24 fixed to the rotatable locking section 20 in the radial direction.

The coil 36 is formed in a tube shape, for example by winding a conductive coil wire into a predetermined shape. The shaft upper portion 34A of the core 34 is inserted into an axial core of the coil 36. The coil 36 is supported by the frame 16 or the like through a support member, not illustrated in the drawings. Current is passed through the coil 36 through wiring, not illustrated in the drawings.

As illustrated in FIG. 1 and FIG. 2, in a state in which a current is not being passed through the coil 36, a magnetic force of the permanent magnet 24 attracting the core 34 causes the permanent magnet 24 to contact the opposing portion 34B of the core 34. This restricts tilting of the rotatable locking section 20 to which the permanent magnet 24 is fixed toward the fixed locking section 22. Note that if the webbing 12 is pulled out sharply from the spool 14, the spool 14 is rotated sharply in the pull-out direction. When this occurs, the rotatable locking section 20 attempts to tilt toward the fixed locking section 22 due to an inertial force that spins the rotatable locking section 20 about its own center of rotation. If this inertial force exceeds the magnetic force of the permanent magnet 24 attracting the core 34, the rotatable locking section 20 tilts toward the fixed locking section 22, and the rotatable locking section 20 (the main engaging teeth 20B and the sub engaging tooth 20C) engage with the fixed locking section 22 (the main engagement teeth 30A of the first fixed locking section 30 and one of the sub engagement teeth 32A of the second fixed locking section 32). Moreover, in the present exemplary embodiment, in a state in which current is not being passed through the coil 36, the magnetic force of the permanent magnet 24 and the like are set such that the rotatable locking section 20 will tilt toward the fixed locking section 22 if the webbing 12 is pulled out from the spool 14 at a speed envisaged during a collision or sudden deceleration of the vehicle such that the spool 14 is rotated in the pull-out direction with an angular acceleration greater than a predetermined angular acceleration.

Moreover, when current is passed through the coil 36 in one direction and a magnetic force of repulsion from the permanent magnet 24 is generated in the core 34, as illustrated by the double-dotted dashed lines in FIG. 3, the rotatable locking section 20 tilts toward the fixed locking section 22. Note that in the present exemplary embodiment, the output of the electromagnet 26 is set such that when current is passed through the coil 36 in the one direction, the rotatable locking section 20 tilts toward the fixed locking section 22 as far as a position where the sub engaging tooth 20C of the rotatable locking section 20 and the leading end portion 32B of one of the sub engagement teeth 32A of the second fixed locking section 32 overlap each other in the circumferential direction. Namely, the electromagnet 26 does not displace the rotatable locking section 20 as far as a position where engagement between the rotatable locking section 20 and the fixed locking section 22 is completed.

When current is passed through the coil 36 in the other direction, a magnetic force pulling on the permanent magnet 24 is generated in the core 34, and the permanent magnet 24 contacts the opposing portion 34B of the core 34 more firmly than when current is not being passed through the coil 36 (the permanent magnet 24 and the core 34 are pulled toward each other). Tilting of the rotatable locking section 20 to which the permanent magnet 24 is fixed toward the fixed locking section 22 is thus more firmly restricted.

Operation and Advantageous Effects of Present Exemplary Embodiment

Explanation follows regarding operation and advantageous effects of the present exemplary embodiment.

As illustrated in FIG. 1 and FIG. 2, in the webbing take-up device 10 of the present exemplary embodiment, an occupant puts on the webbing 12 by pulling out the webbing 12 from the spool 14. Note that in the present exemplary embodiment, in a state in which the vehicle ignition has been switched ON and the occupant is not wearing the webbing 12, current is passed through the coil 36 in the other direction. A magnetic force pulling on the permanent magnet 24 is thereby generated in the core 34, such that the permanent magnet 24 contacts the opposing portion 34B of the core 34 more firmly than when current is not being passed through the coil 36. Accordingly, even if the webbing 12 is pulled out quickly from the spool 14, the rotatable locking section 20 does not tilt toward the fixed locking section 22, enabling the occupant to quickly put on the webbing 12. Current stops being passed through the coil 36 when a buckle switch or the like detects that the occupant has put on the webbing 12.

When the buckle switch or the like detects that the occupant has removed the webbing 12, current is passed through the coil 36 in the other direction. A magnetic force pulling on the permanent magnet 24 is thereby generated in the core 34, such that the permanent magnet 24 contacts the opposing portion 34B of the core 34 more firmly than when current is not being passed through the coil 36. Accordingly, the rotatable locking section 20 is not liable to tilt toward the fixed locking section 22 even if rotation of the spool 14 stops sharply when the webbing 12 is taken up onto the spool 14. Unwanted engagement of the rotatable locking section 20 with the fixed locking section 22 is thereby suppressed, enabling unwanted locking of rotation of the spool 14 to be suppressed.

When the occupant is wearing the webbing 12, current is not passed through the coil 36 in a normal state of the vehicle (when not in a vehicle emergency). Power consumption is thereby suppressed in the normal state of the vehicle.

In a vehicle emergency, current is passed through the coil 36 in the one direction. A magnetic force of repulsion from the permanent magnet 24 is thereby generated in the core 34, and the rotatable locking section 20 to which the permanent magnet 24 is fixed tilts toward the fixed locking section 22. Note that a vehicle emergency refers to cases in which it is determined to be necessary to restrain the occupant in the vehicle seat, for example cases in which the vehicle is involved in a collision, overturns, or falls, and cases in which a collision or the like has been predicted. Determination criteria for a vehicle emergency may be set as appropriate in consideration of occupant injury criteria or the like. For example, cases in which an acceleration in the vehicle front-rear direction and left-right direction of a predetermined value or greater acts on the vehicle may be a determination criterion for a vehicle emergency. Alternatively, cases in which the direction of a composite force of gravity and inertial force acting on the vehicle diverges from a vehicle reference axis by a predetermined angle or greater may be a determination criterion for a vehicle emergency. In the present exemplary embodiment, current is passed continuously through the coil 36 in the one direction until a "vehicle emergency" determination changes to a "normal vehicle state" determination. When a "normal vehicle state" determination is made following a "vehicle emergency" determination, current is then passed through the coil 36 in the other direction. The magnetic force pulling the permanent magnet 24 and the core 34 toward each other quickly returns (tilts) the rotatable locking section 20 to a position where it does not engage with the fixed locking section 22.

When current is passed through the coil 36 in the one direction such that the rotatable locking section 20 tilts toward the fixed locking section 22, the sub engaging tooth 20C of the rotatable locking section 20 and the leading end portion 32B of one of the sub engagement teeth 32A of the second fixed locking section 32 overlap each other in the circumferential direction. In this state, when the occupant wearing the webbing 12 moves toward the front side with respect to the vehicle seat such that the webbing 12 is pulled out from the spool 14, the spool 14 is rotated in the pull-out direction. When this occurs, as illustrated by the double-dotted dashed lines in FIG. 3, the sub engaging tooth 20C of the rotatable locking section 20 and the leading end portion 32B of the sub engagement tooth 32A of the second fixed locking section 32 contact each other in the circumferential direction.

Figure 4:
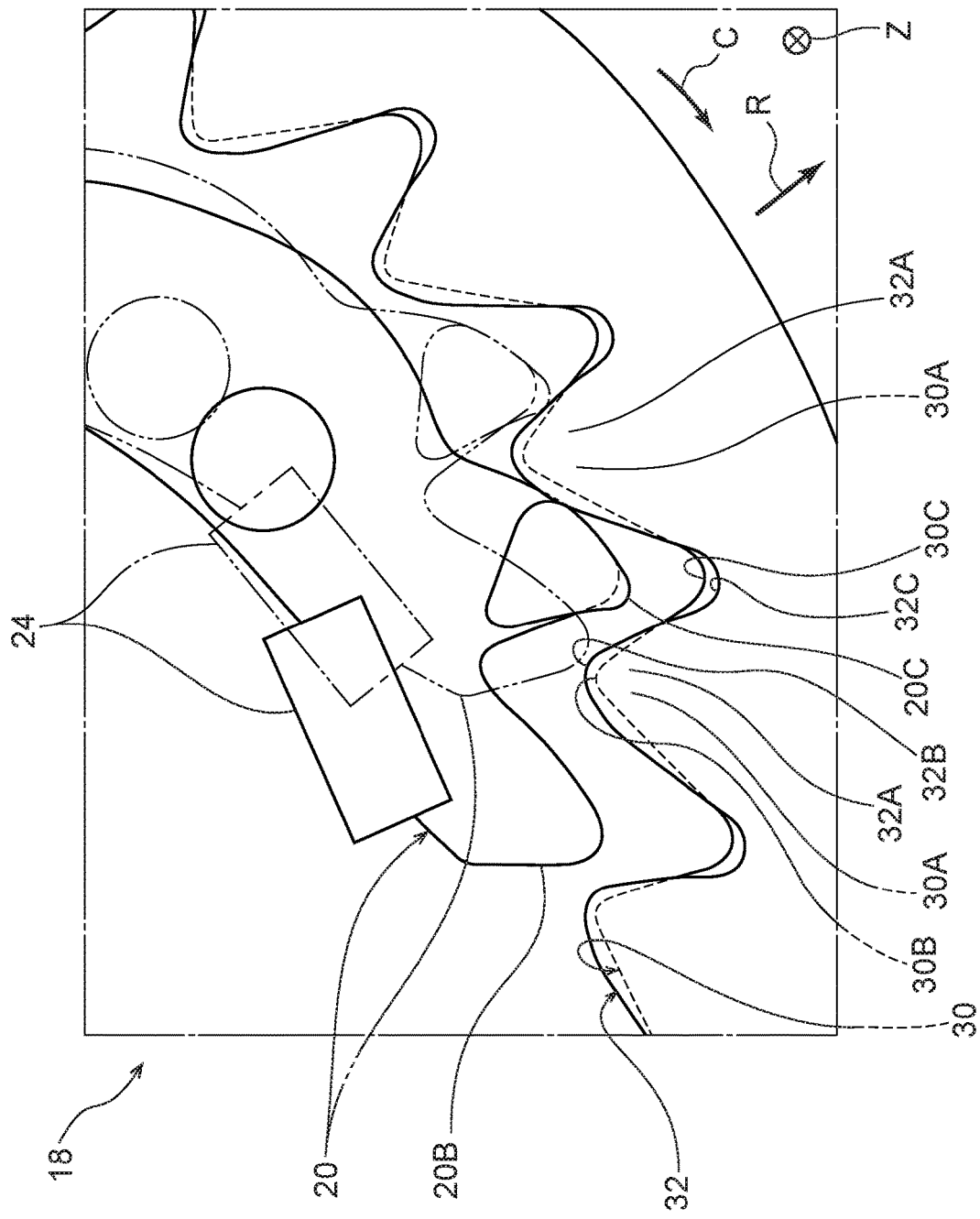
FIG. 4 is a side view corresponding to FIG. 3, illustrating a state in which a spool has rotated by 8° in a pull-out direction from the state illustrated in FIG. 3.
Figure 5:
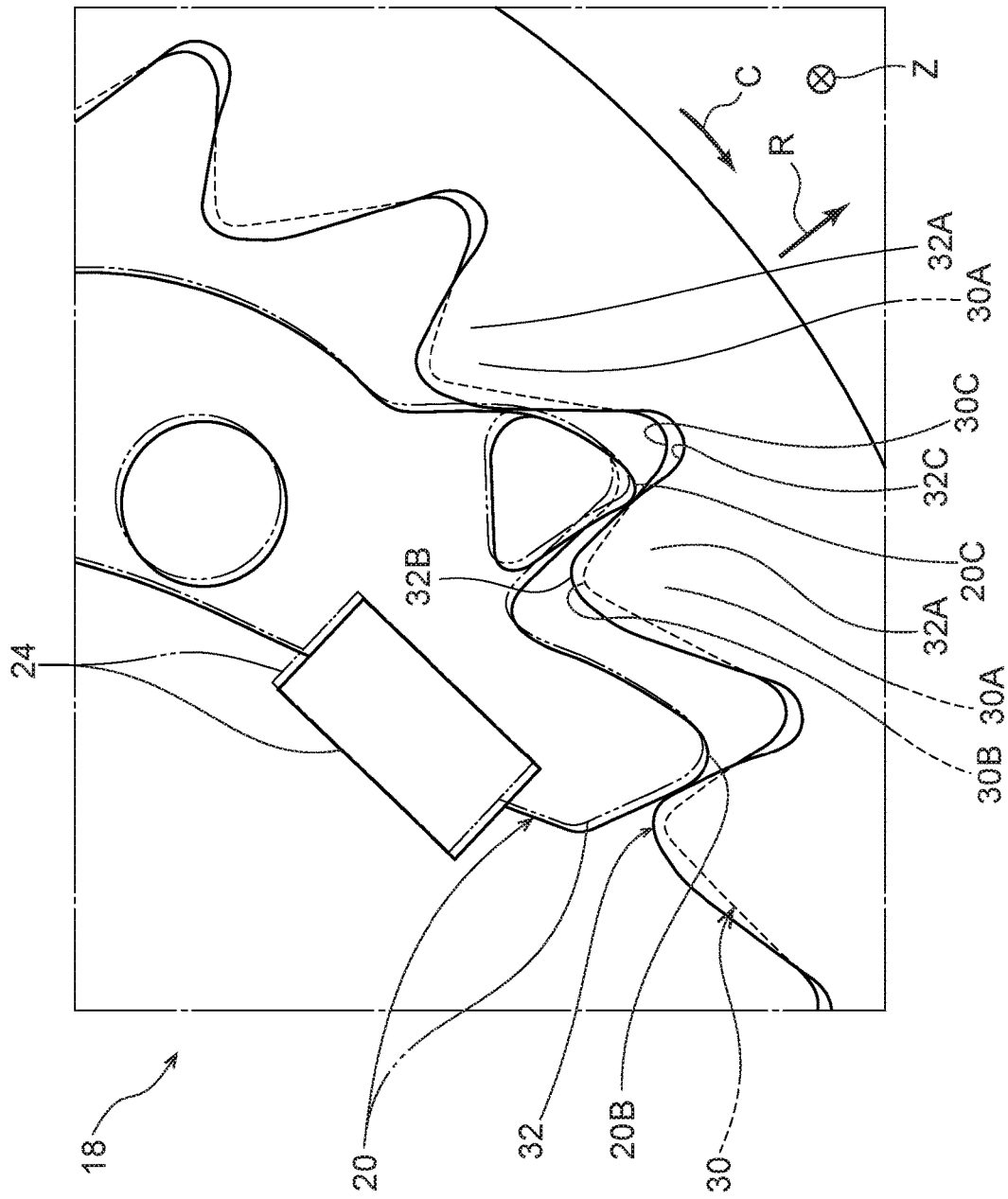
FIG. 5 is a side view corresponding to FIG. 3, illustrating a state in which the spool has rotated by 10° in the pull-out direction from the state illustrated in FIG. 4.
Figure 6:
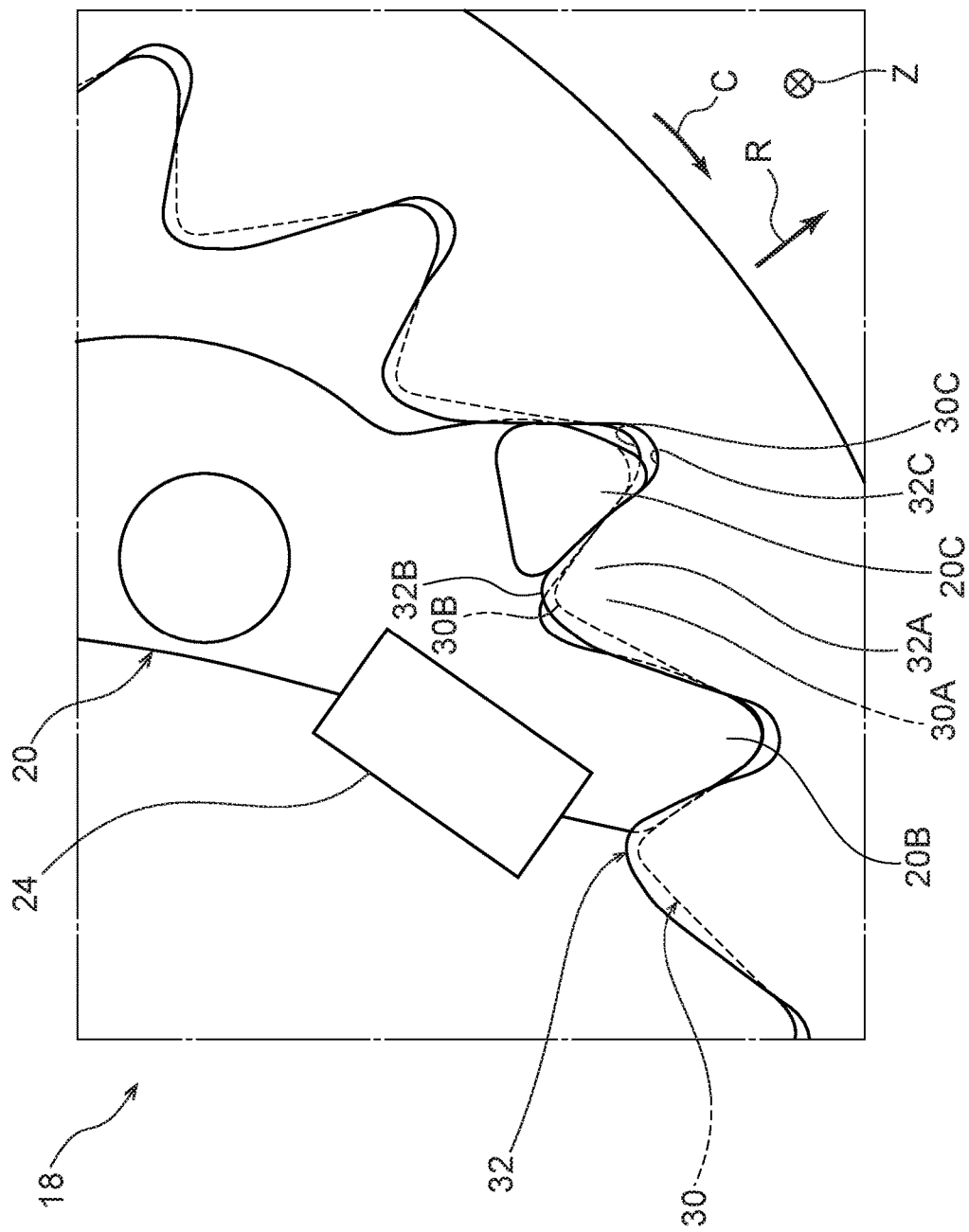
FIG. 6 is a side view corresponding to FIG. 3, illustrating a state in which the spool has rotated by 15° in the pull-out direction from the state illustrated in FIG. 5, and spool rotation is locked.
Figure 7:
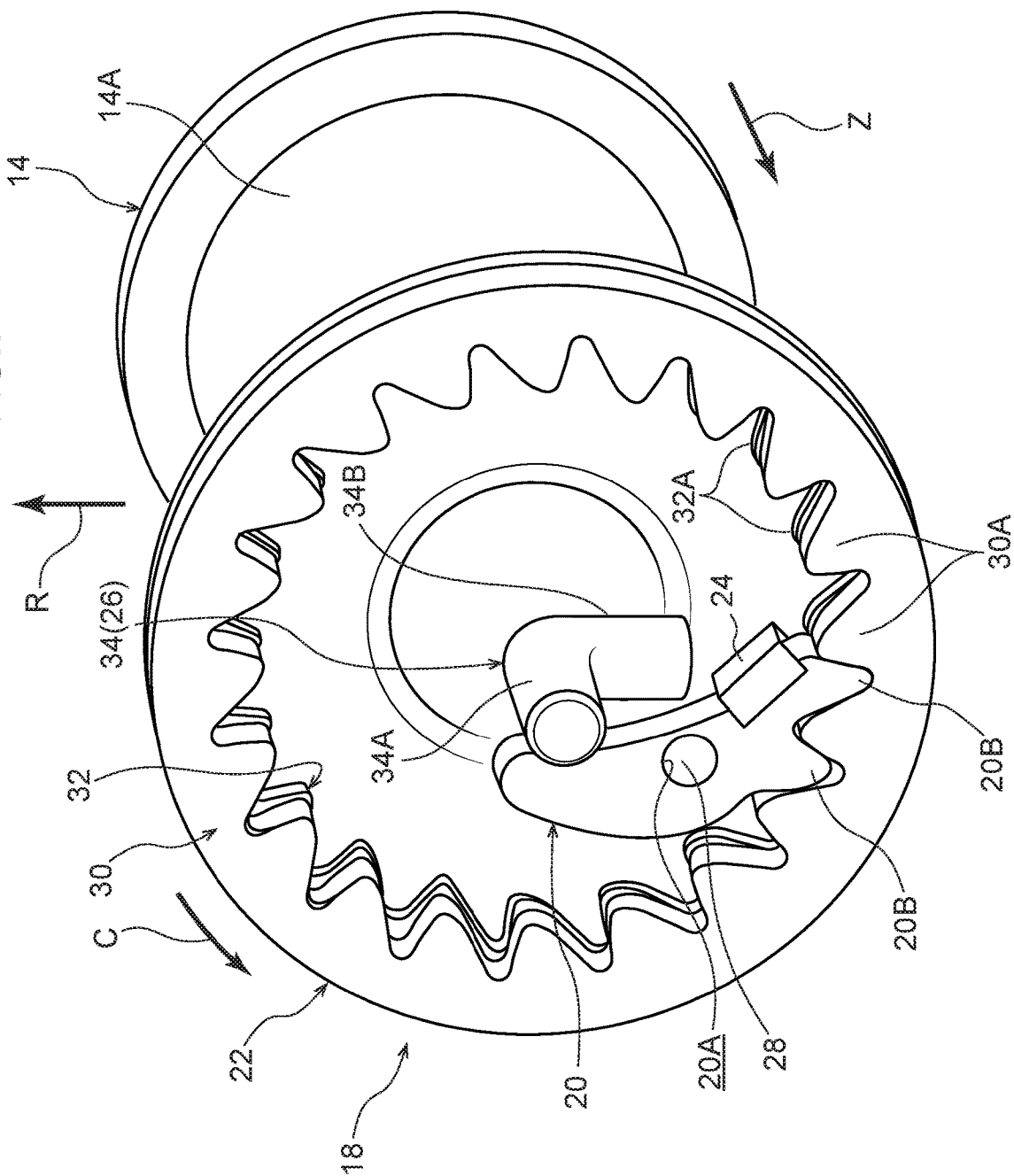
FIG. 7 is an enlarged perspective view corresponding to FIG. 2, illustrating a locking mechanism in a state in which spool rotation is locked.
Figure 8:
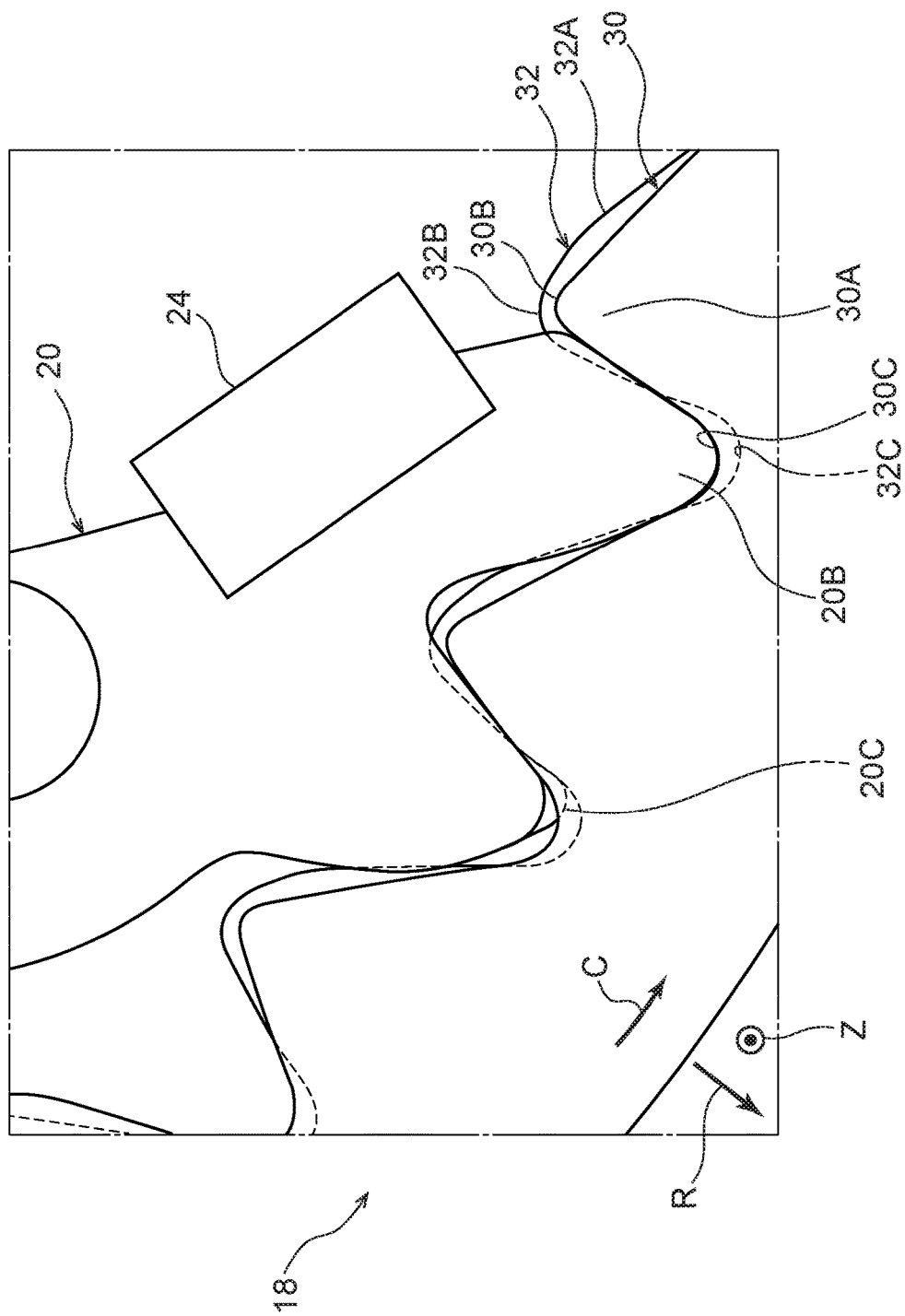
FIG. 8 is a side view illustrating a state in which engagement between a rotatable locking section and a fixed locking section is completed, as viewed from the opposite side to the side illustrated in FIG. 6.

If the webbing 12 is pulled further out from the spool 14 after the sub engaging tooth 20C of the rotatable locking section 20 and the leading end portion 32B of the sub engagement tooth 32A of the second fixed locking section 32 have contacted each other in the circumferential direction, the spool 14 is rotated further in the pull-out direction. When this occurs, as illustrated in FIG. 4 and FIG. 5, the sub engaging tooth 20C of the rotatable locking section 20 moves along the sub engagement tooth 32A of the second fixed locking section 32. Accordingly, the rotatable locking section 20 tilts further toward the fixed locking section 22, and the main engaging teeth 20B of the rotatable locking section 20 move toward the terminal portions 30C of the corresponding main engagement teeth 30A of the first fixed locking section 30. If the webbing 12 is then pulled out even further from the spool 14, the spool 14 is rotated further in the pull-out direction, and as illustrated in FIG. 6 to FIG. 8, the main engaging teeth 20B of the rotatable locking section 20 contact the terminal portions 30C of the corresponding main engagement teeth 30A of the first fixed locking section 30. In this state, pull-out direction rotation of the spool 14 is locked, restricting pull-out of the webbing 12 from the spool 14. The body of the occupant is thereby restrained by the webbing 12.

Note that if the webbing 12 is pulled out sharply from the spool 14 when a fault has arisen such that current cannot be passed through the coil 36, or in an OFF state of the ignition (when current is not being passed through the coil 36), the rotatable locking section 20 is displaced toward the fixed locking section 22 by an inertial force that spins the rotatable locking section 20 about its own center of rotation. When the webbing 12 is pulled out further from the spool 14, the rotatable locking section 20 (the main engaging teeth 20B and the sub engaging tooth 20C) engages with the fixed locking section 22 (the main engagement teeth 30A of the first fixed locking section 30 and one of the sub engagement teeth 32A of the second fixed locking section 32). Pull-out direction rotation of the spool 14 is thereby locked, restricting pull-out of the webbing 12 from the spool 14. The body of the occupant is restrained by the webbing 12 as a result. In this manner, in the present exemplary embodiment, the body of the occupant can be restrained by the webbing 12 even if the webbing 12 is pulled out sharply from the spool 14 as might be envisaged in a vehicle emergency in a state in which a fault has arisen such that current cannot be passed through the coil 36, or in an OFF state of the ignition. Note that if slack arises in the webbing 12 after the body of the occupant has been restrained by the webbing 12, the rotatable locking section 20 is returned (tilted) to a position where it does not engage with the fixed locking section 22 by the magnetic force of the permanent magnet 24 attracting the core 34.

Moreover, in the present exemplary embodiment, in a normal state that is not a vehicle emergency, tilting of the rotatable locking section 20 toward the fixed locking section 22 is restricted by the magnetic force of the permanent magnet 24 attracting the core 34. Unwanted engagement of the rotatable locking section 20 with the fixed locking section 22 is thereby suppressed, enabling unwanted locking of rotation of the spool 14 to be suppressed.

Moreover, in the present exemplary embodiment, the shaft upper portion 34A of the core 34 that rotates as a unit together with the spool 14 is disposed on the rotation axis of the spool 14, and the coil 36 is disposed around the shaft upper portion 34A of the core 34. This enables the wiring route to the coil 36 to be suppressed from becoming complex. As a result, the configuration of the webbing take-up device 10 can also be suppressed from becoming complex. Moreover, the number of configuration components of the webbing take-up device 10 can be reduced due to having a configuration in which the coil 36 does not rotate together with the spool 14.

In the present exemplary embodiment, the electromagnet 26 does not displace the rotatable locking section 20 as far as a position where engagement between the rotatable locking section 20 and the fixed locking section 22 is completed. This thereby enables an increase in the physical size of the electromagnet 26 (a higher electromagnet output) to be suppressed. This enables the physical size of the webbing take-up device 10 to be made smaller as a result.

Moreover, as illustrated in FIG. 3, in the present exemplary embodiment, when the rotatable locking section 20 engages with the fixed locking section 22, first, the sub engaging tooth 20C of the rotatable locking section 20 and the leading end portion 32B of one of the sub engagement teeth 32A of the second fixed locking section 32 contact each other. In this manner, the sub engaging tooth 20C of the metal rotatable locking section 20 and the leading end portion 32B of the sub engagement tooth 32A of the resin second fixed locking section 32 contact each other first, thereby enabling the initial impact when the rotatable locking section 20 engages with the fixed locking section 22 to be lessened. Damage to the rotatable locking section 20 and the fixed locking section 22 is suppressed as a result, enabling the durability of the locking mechanism 18 for locking rotation of the spool 14 to be improved.

In the present exemplary embodiment, the fixed locking section 22 has a divided structure configured of the first fixed locking section 30 and the second fixed locking section 32. Selecting the materials used for the first fixed locking section 30 and the second fixed locking section 32 thereby enables the hardness and strength thereof to be easily set.

Locking Mechanism of Another Embodiment

Next, explanation follows regarding a locking mechanism 38 of another embodiment, with reference to FIG. 9A to FIG. 11B. Note that in the locking mechanism 38 of this other embodiment, members and sections corresponding to those of the locking mechanism 18 described above are allocated the same reference numerals as these members and sections in the locking mechanism 18 described above, and explanation thereof may be omitted.

As illustrated in FIG. 9A and FIG. 9B, the locking mechanism 38 includes a rotatable locking section 20 and a fixed locking section 22 that the rotatable locking section 20 engages with to lock pull-out direction rotation of the spool 14. The locking mechanism 38 further includes a return spring 40, serving as a restricting section and a biasing member, that biases the rotatable locking section 20 toward the opposite side to the fixed locking section 22. The locking mechanism 38 further includes an actuator 46 including an electromagnet 26 with a coil 36, a moving member 42 that moves toward one axial direction side when current is passed through the coil 36, and a return spring 44 that biases the moving member 42 toward the other axial direction side.

A support hole 20A is formed in an end portion on the other circumferential direction side of the rotatable locking section 20. The rotatable locking section 20 is fixed to one axial direction side end portion of the spool 14 at a portion of the spool 14 on the radial direction outer side of the rotation axis (center of rotation) of the spool 14 through a support pin 28 inserted through the support hole 20A. A load transmission section 48 formed with a substantially U-shape as viewed along the axial direction is fixed to an inner peripheral portion of an end portion on the one circumferential direction side (pull-out direction side) of the rotatable locking section 20. An end portion on one side of the return spring 40 is anchored to a circumferential direction intermediate portion of the rotatable locking section 20. An end portion on the other side of the return spring 40 is anchored to the one axial direction side end portion of the spool 14.

The moving member 42 that configures part of the actuator 46 is formed in a rod shape disposed coaxially with the rotation axis of the spool 14. An engaging groove 42A recessed toward the axial core of the moving member 42 is formed around the entire circumference of the moving member 42 in the circumferential direction at one portion of the moving member 42.

In a state in which the load transmission section 48 fixed to the rotatable locking section 20 is disposed in the engaging groove 42A of the moving member 42, the rotatable locking section 20 is positioned at a position where the rotatable locking section 20 (the main engaging teeth 20B and the sub engaging tooth 20C) is not engaged with the fixed locking section 22 (the main engagement teeth 30A of the first fixed locking section 30 and the sub engagement teeth 32A of the second fixed locking section 32).

Figure 10A:
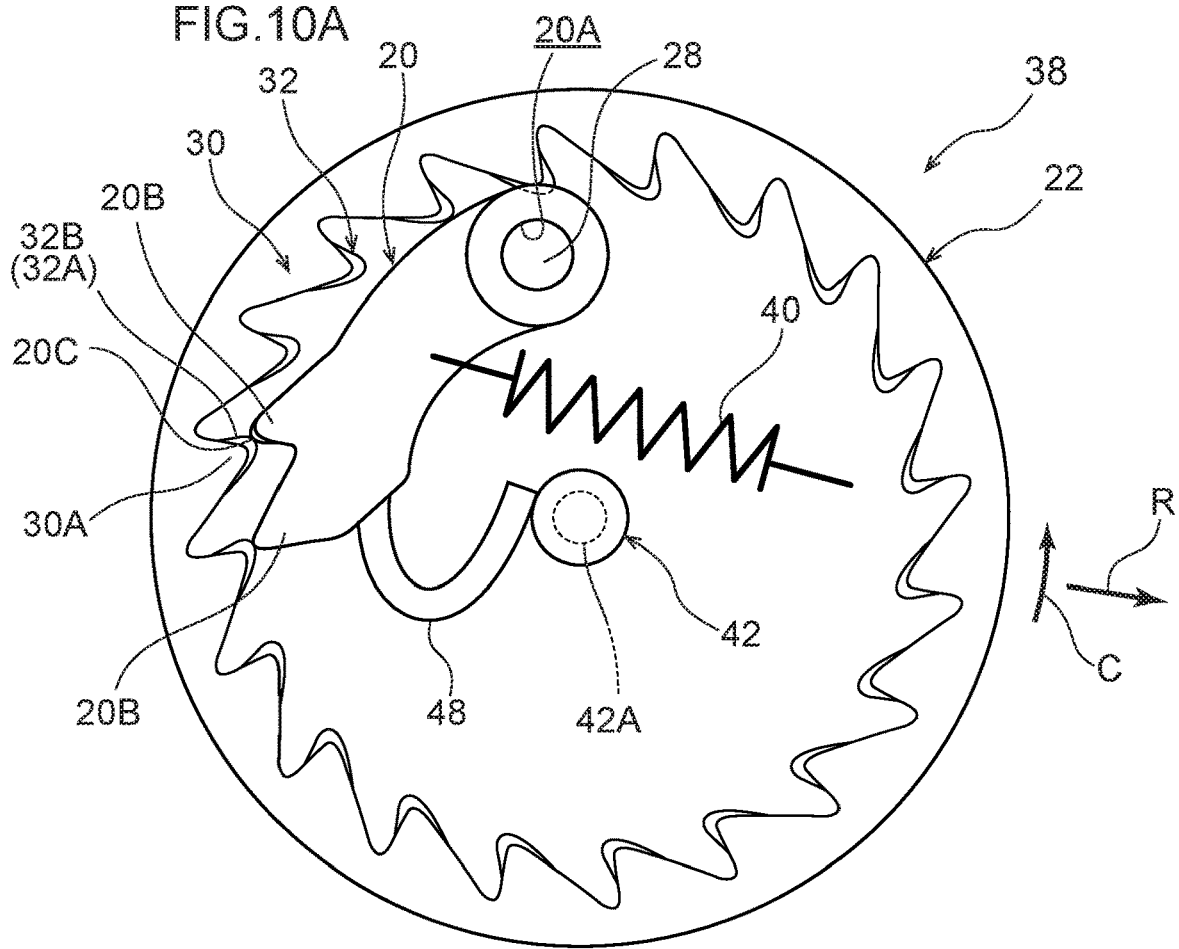
FIG. 10A is a side view illustrating another locking mechanism in an actuated state of an electromagnet.
Figure 10B:
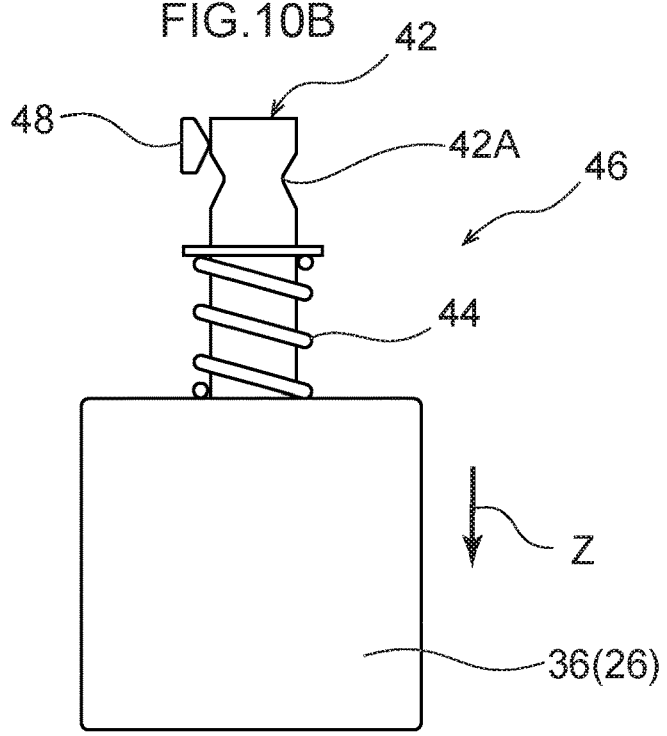
FIG. 10B is a plan view illustrating a relationship between an electromagnet and a load transmission section.

As illustrated in FIG. 10A and FIG. 10B, when a current is passed through the coil 36 such that the moving member 42 moves toward the one axial direction side, the load transmission section 48 leaves the engaging groove 42A of the moving member 42. The rotatable locking section 20 is thereby pressed through the load transmission section 48 and accordingly moves toward the radial direction outer side. As a result, the rotatable locking section 20 is tilted toward the fixed locking section 22 as far as a position where the sub engaging tooth 20C of the rotatable locking section 20 and the leading end portion 32B of one of the sub engagement teeth 32A of the second fixed locking section 32 overlap each other in the circumferential direction.

Operation and Advantageous Effects of Locking Mechanism 38 of Present Exemplary Embodiment Explanation follows regarding operation and advantageous effects of the locking mechanism 38 of the present exemplary embodiment.

In a webbing take-up device including the locking mechanism 38 of the present exemplary embodiment, current is passed through the coil 36 in one direction in a vehicle emergency. As illustrated in FIG. 10A and FIG. 10B, the moving member 42 thereby moves toward the one axial direction side and the load transmission section 48 leaves the engaging groove 42A of the moving member 42. The rotatable locking section 20 is pushed by the load transmission section 48 and moves toward the radial direction outer side as a result. Accordingly, the rotatable locking section 20 is tilted toward the fixed locking section 22 as far as a position where the sub engaging tooth 20C of the rotatable locking section 20 and the leading end portion 32B of one of the sub engagement teeth 32A of the second fixed locking section 32 overlap with each other in the circumferential direction. Note that if, after determination of a "vehicle emergency", a "normal vehicle state" is then determined without the webbing 12 being pulled out from the spool 14, the current passed through the coil 36 is shut off. As a result, the moving member 42 returns toward the other axial direction side under the biasing force of the return spring 44, and the rotatable locking section 20 returns under the biasing force of the return spring 40 to a position where the rotatable locking section 20 does not engage with the fixed locking section 22 (the load transmission section 48 returns to a position engaged with the engaging groove 42A of the moving member 42).

In a state in which the sub engaging tooth 20C of the rotatable locking section 20 and the leading end portion 32B of the sub engagement tooth 32A of the second fixed locking section 32 overlap each other in the circumferential direction, when the occupant wearing the webbing 12 moves toward the front side with respect to the vehicle seat such that the webbing 12 is pulled out from the spool 14, the spool 14 is rotated in the pull-out direction. When this occurs, the sub engaging tooth 20C of the rotatable locking section 20 and the leading end portion 32B of the sub engagement tooth 32A of the second fixed locking section 32 contact each other in the circumferential direction. Note that FIG. 10A illustrates a state in which the sub engaging tooth 20C of the rotatable locking section 20 and the leading end portion 32B of the sub engagement tooth 32A of the second fixed locking section 32 are contacting each other in the circumferential direction.

Figure 11A:
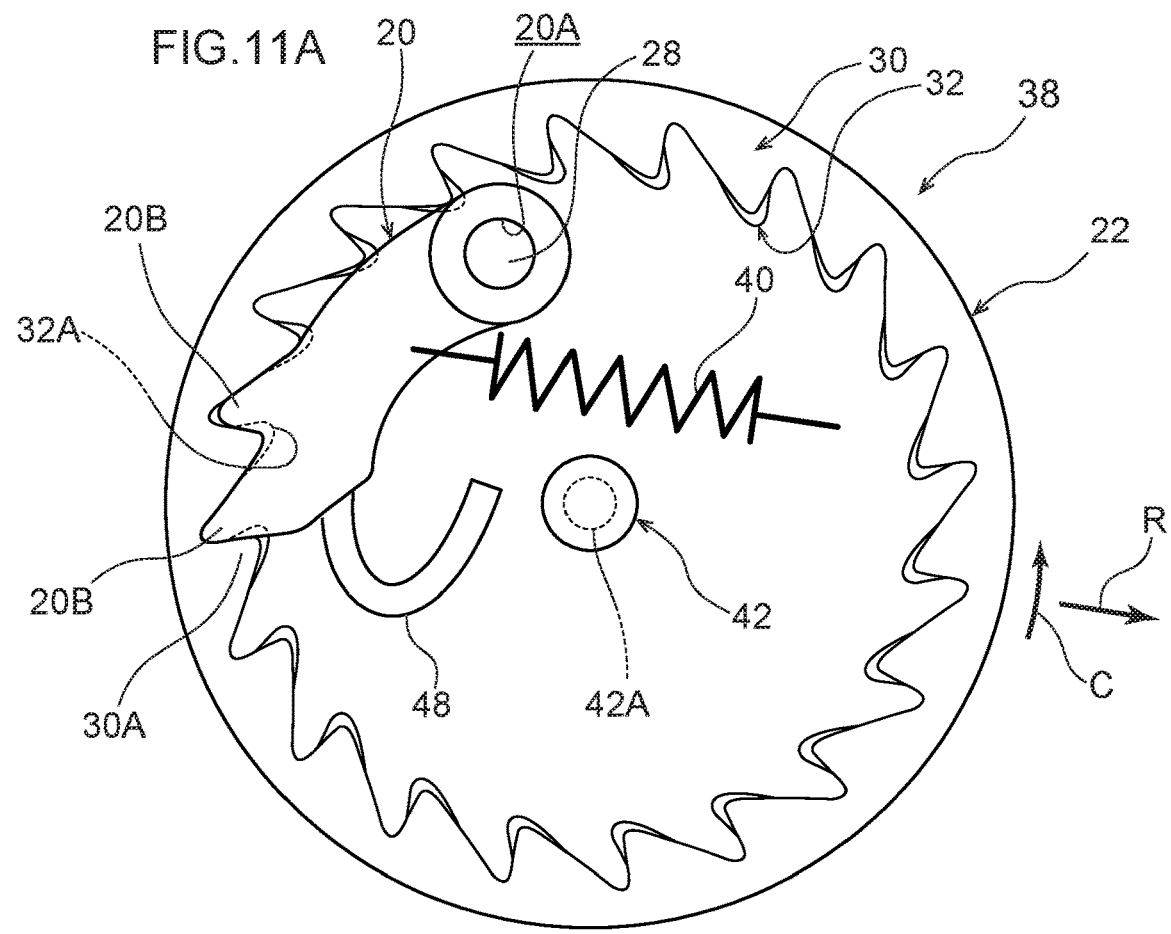
FIG. 11A is a side view illustrating another locking mechanism in a state in which engagement of a rotatable locking section to a fixed locking section is completed.
Figure 11B:
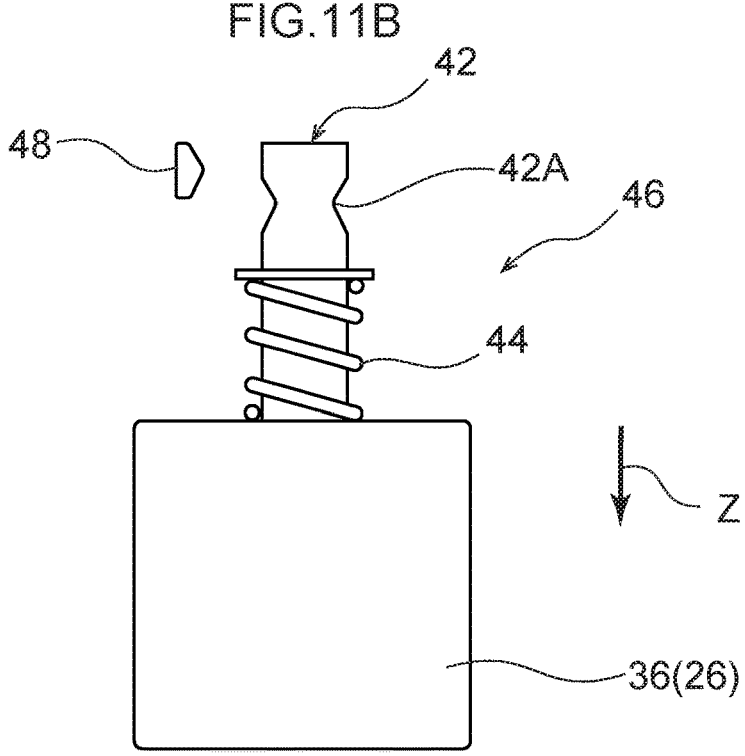
FIG. 11B is a plan view illustrating a relationship between an electromagnet and a load transmission section.

If the webbing 12 is pulled out further from the spool 14 after the sub engaging tooth 20C of the rotatable locking section 20 and the leading end portion 32B of the sub engagement tooth 32A of the second fixed locking section 32 have contacted each other in the circumferential direction, the spool 14 is rotated further in the pull-out direction. When this occurs, as illustrated in FIG. 11A and FIG. 11B, the rotatable locking section 20 tilts further toward the fixed locking section 22, and the main engaging teeth 20B of the rotatable locking section 20 contact the terminal portions 30C of the corresponding main engagement teeth 30A of the first fixed locking section 30. In this state, pull-out direction rotation of the spool 14 is locked, restricting pull-out of the webbing 12 from the spool 14. The body of the occupant is thereby restrained by the webbing 12.

Note that if the webbing 12 is pulled out sharply from the spool 14 when a fault has arisen such that current cannot be passed through the coil 36, or in an OFF state of the ignition (when current is not being passed through the coil 36), the rotatable locking section 20 is displaced toward the fixed locking section 22 by an inertial force that spins the rotatable locking section 20 about its own center of rotation and by a centrifugal force acting on the rotatable locking section 20. When the webbing 12 is pulled out further from the spool 14, the rotatable locking section 20 (the main engaging teeth 20B and the sub engaging tooth 20C) engage with the fixed locking section 22 (the main engagement teeth 30A of the first fixed locking section 30 and one of the sub engagement teeth 32A of the second fixed locking section 32). Pull-out direction rotation of the spool 14 is thereby locked, restricting pull-out of the webbing 12 from the spool 14. The body of the occupant is restrained by the webbing 12 as a result. In this manner, in the present exemplary embodiment, the body of the occupant can be restrained by the webbing 12 even if the webbing 12 is pulled out sharply from the spool 14 as might be envisaged in a vehicle emergency in a state in which a fault has arisen such that current cannot be passed through the coil 36, or in an OFF state of the ignition. Note that if slack arises in the webbing 12 after the body of the occupant has been restrained by the webbing 12, the rotatable locking section 20 is returned (tilted) by the biasing force of the return spring 40 to a position where it does not engage with the fixed locking section 22.

Moreover, in the present exemplary embodiment, in a normal state that is not a vehicle emergency, tilting of the rotatable locking section 20 toward the fixed locking section 22 is restricted by the biasing force of the return spring 40. Unwanted engagement of the rotatable locking section 20 with the fixed locking section 22 is thereby suppressed, enabling unwanted locking of rotation of the spool 14 to be suppressed.

Moreover, in the present exemplary embodiment, the electromagnet 26, the moving member 42, and the load transmission section 48 do not displace the rotatable locking section 20 as far as a position where engagement of the rotatable locking section 20 and the fixed locking section 22 is completed. This thereby enables an increase in the physical size of the electromagnet 26 and the moving member 42 (a higher electromagnet output) to be suppressed. This thereby enables the physical size of the webbing take-up device provided with the locking mechanism 38 of the present exemplary embodiment to be made smaller as a result. Note that configuration may be made in which the load transmission section 48 is not provided, and the moving member 42 presses the rotatable locking section 20 directly.

Moreover, a locking mechanism may be configured by combining part of the configuration of the locking mechanism 18 described above and part of the configuration of the locking mechanism 38 of the present exemplary embodiment as appropriate.

Locking Mechanism of Another Embodiment

Next, explanation follows regarding a locking mechanism 50 of another embodiment, with reference to FIG. 12 to FIG. 19. Note that in the locking mechanism 50 of this other embodiment, members and sections corresponding to those of the locking mechanisms 18, 38 described above are allocated the same reference numerals as these members and sections in the locking mechanisms 18, 38 described above, and explanation thereof may be omitted.

Figure 12:
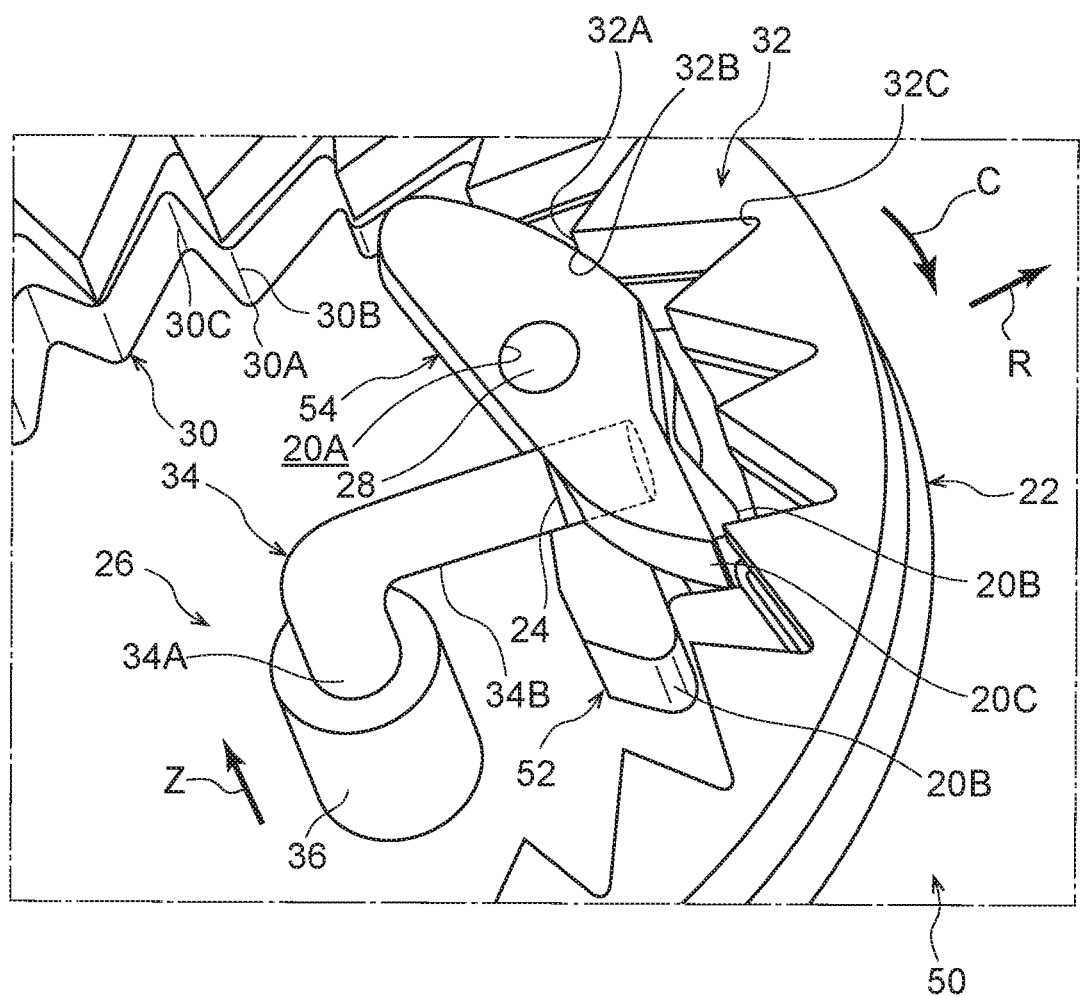
FIG. 12 is a perspective view illustrating a locking mechanism of another embodiment.
Figure 13:
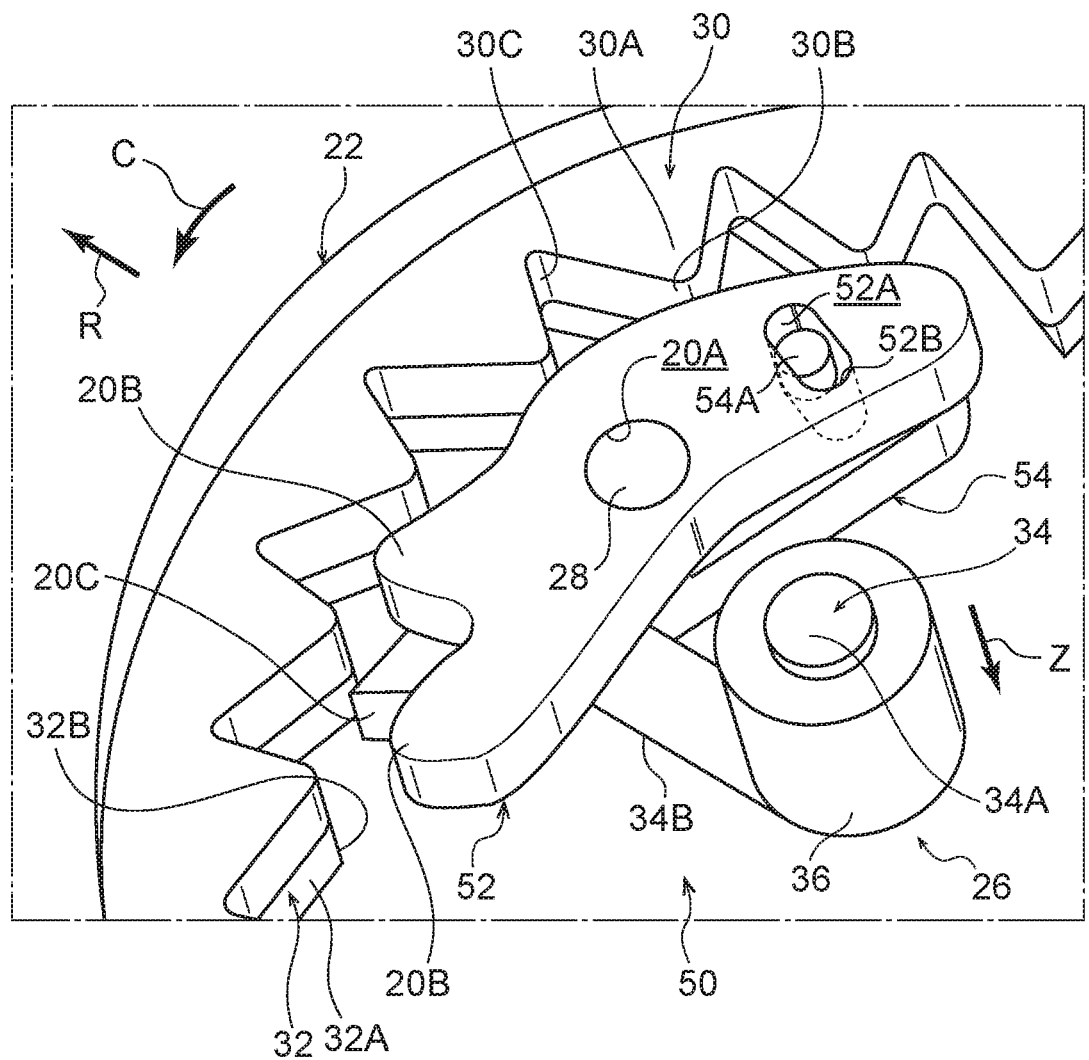
FIG. 13 is a perspective view illustrating a locking mechanism of another embodiment from the opposite side to FIG. 12.

As illustrated in FIG. 12 and FIG. 13, the other locking mechanism 50 of the present exemplary embodiment includes a first rotatable locking section 52 and a second rotatable locking section 54 in place of the rotatable locking section 20 (see FIG. 2) described above.

As illustrated in FIG. 13, the configuration of the first rotatable locking section 52 is similar to the configuration of the rotatable locking section 20 described above with the exception that the sub engaging tooth 20C (see FIG. 2) is not provided, and that an engaging hole 52A is formed. The engaging hole 52A is formed penetrating the first rotatable locking section 52 in the axial direction on the opposite side to the side where the main engaging teeth 20B is formed. As viewed along the axial direction, the engaging hole 52A is formed as a hole with an elongated shape along the radial direction.

As illustrated in FIG. 12, the second rotatable locking section 54 is formed in a substantially half-moon shape as viewed along the axial direction. The second rotatable locking section 54 is formed from a resin material, and is thus lighter in weight than the first rotatable locking section 52. A circular support hole 20A is formed penetrating a central portion of the second rotatable locking section 54 in the axial direction. The second rotatable locking section 54 is fixed to the spool 14 together with the first rotatable locking section 52 through a support pin 28 inserted through the support hole 20A. An end portion on one circumferential direction side (pull-out direction side) of the second rotatable locking section 54 is formed with a sub engaging tooth 20C that engages with the second fixed locking section 32. The sub engaging tooth 20C is formed with a sharper pointed shaped leading end than the main engaging teeth 20B of the first rotatable locking section 52 as viewed along the axial direction. Moreover, the permanent magnet 24 is embedded on the side of the second rotatable locking section 54 formed with the sub engaging tooth 20C. Note that in the present exemplary embodiment, a portion of the permanent magnet 24 is exposed toward the core 34 of the electromagnet 26. A circular column shaped engaging projection 54A that projects toward the first rotatable locking section 52 so as to be disposed within the engaging hole 52A formed in the first rotatable locking section 52 is formed on the opposite side of the second rotatable locking section 54 to the side formed with the sub engaging tooth 20C. The engaging projection 54A is capable of moving along the length direction of the engaging hole 52A within the engaging hole 52A, and the second rotatable locking section 54 is therefore capable of tilting (displaceable) about the support pin 28 by a predetermined angle with respect to the first rotatable locking section 52. When the second rotatable locking section 54 tilts with respect to the first rotatable locking section 52, the sub engaging tooth 20C of the second rotatable locking section 54 projects toward the radial direction outer side with respect to a portion of the first rotatable locking section 52 formed with the main engaging teeth 20B.

Operation and Advantageous Effects of Locking Mechanism 50 of Present Exemplary Embodiment Explanation follows regarding operation and advantageous effects of the locking mechanism 50 of the present exemplary embodiment.

Figure 14:
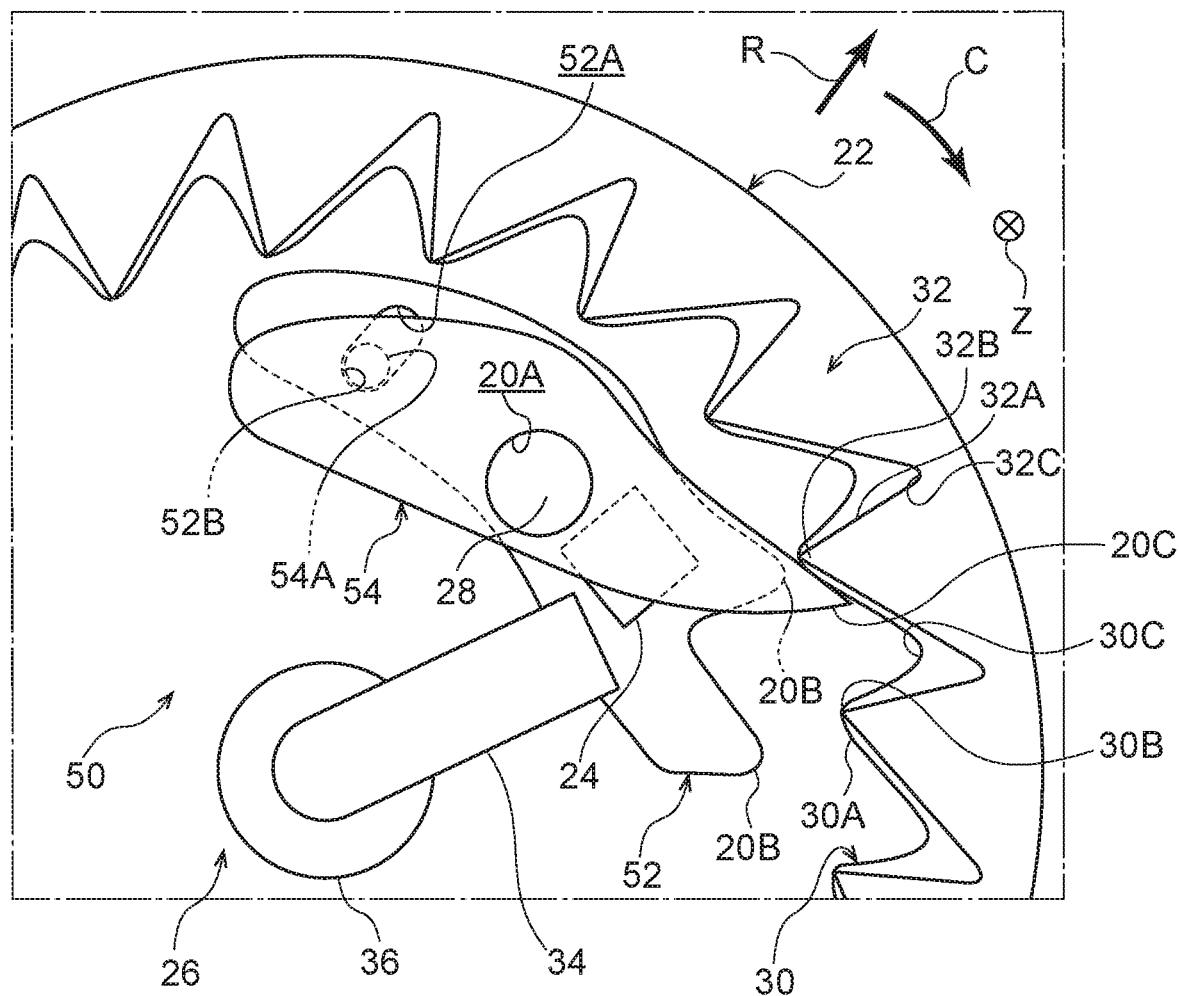
FIG. 14 is a side view illustrating a first rotatable locking section, a second rotatable locking section, and the like in an actuated state of an electromagnet.

In the locking mechanism 50 described above, a current is passed through the coil 36 in the one direction in a vehicle emergency. When the current is passed through the coil 36 in the one direction, a magnetic force of repulsion from the permanent magnet 24 is generated in the core 34. As illustrated in FIG. 14, the second rotatable locking section 54 to which the permanent magnet 24 is fixed thereby tilts with respect to the first rotatable locking section 52, and the sub engaging tooth 20C of the second rotatable locking section 54 projects toward the radial direction outer side with respect to the portion of the first rotatable locking section 52 formed with the main engaging teeth 20B. Note that in the present exemplary embodiment, the second rotatable locking section 54 tilts with respect to the first rotatable locking section 52 as far as a position where the engaging projection 54A of the second rotatable locking section 54 abuts an end portion 52B on the radial direction inside of the engaging hole 52A of the first rotatable locking section 52.

Figure 15:
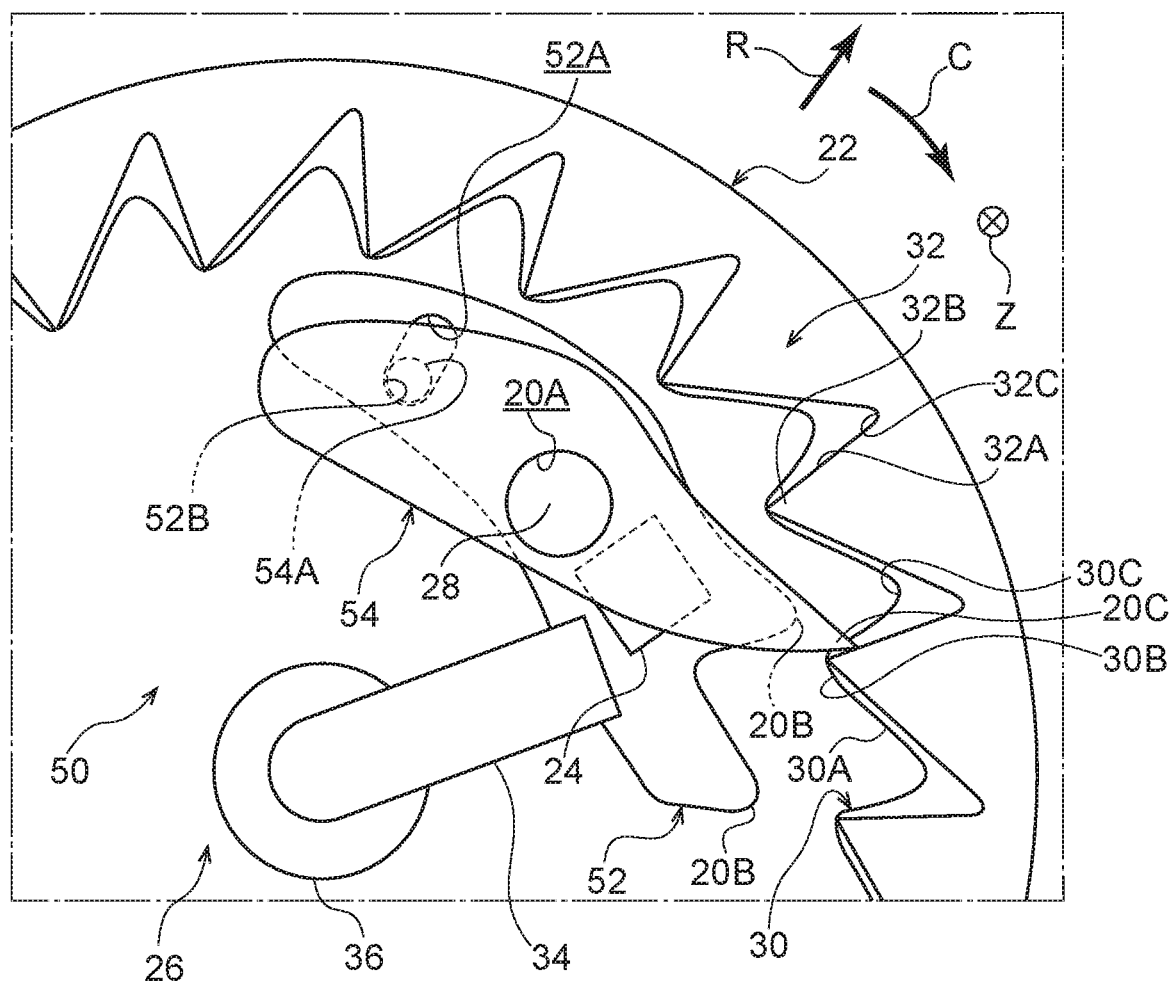
FIG. 15 is a side view corresponding to FIG. 14, illustrating a state in which a spool has rotated in a pull-out direction from the state illustrated in FIG. 14.

When the second rotatable locking section 54 tilts with respect to the first rotatable locking section 52, the sub engaging tooth 20C of the second rotatable locking section 54 and the leading end portion 32B of one of the sub engagement teeth 32A of the second fixed locking section 32 overlap each other in the circumferential direction. In this state, when the occupant wearing the webbing 12 (see FIG. 1) moves toward the front side with respect to the vehicle seat such that the webbing 12 is pulled out from the spool 14 (see FIG. 1), the spool 14 is rotated in the pull-out direction. When this occurs, as illustrated in FIG. 15, the sub engaging tooth 20C of the second rotatable locking section 54 and the leading end portion 32B of the sub engagement tooth 32A of the second fixed locking section 32 contact each other in the circumferential direction.

Figure 16:
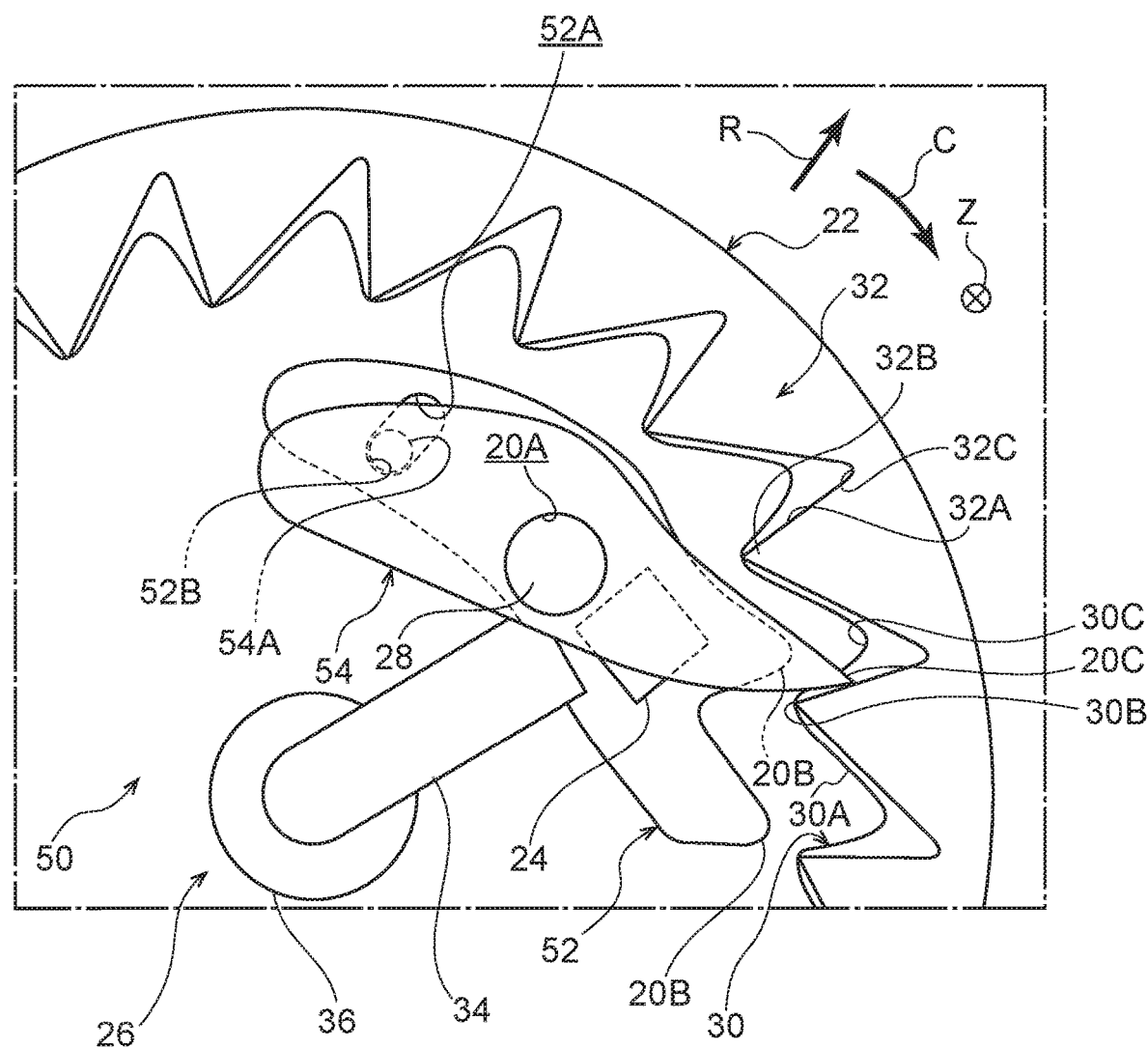
FIG. 16 is a side view corresponding to FIG. 14, illustrating a state in which the spool has rotated in the pull-out direction from the state illustrated in FIG. 15.
Figure 17:
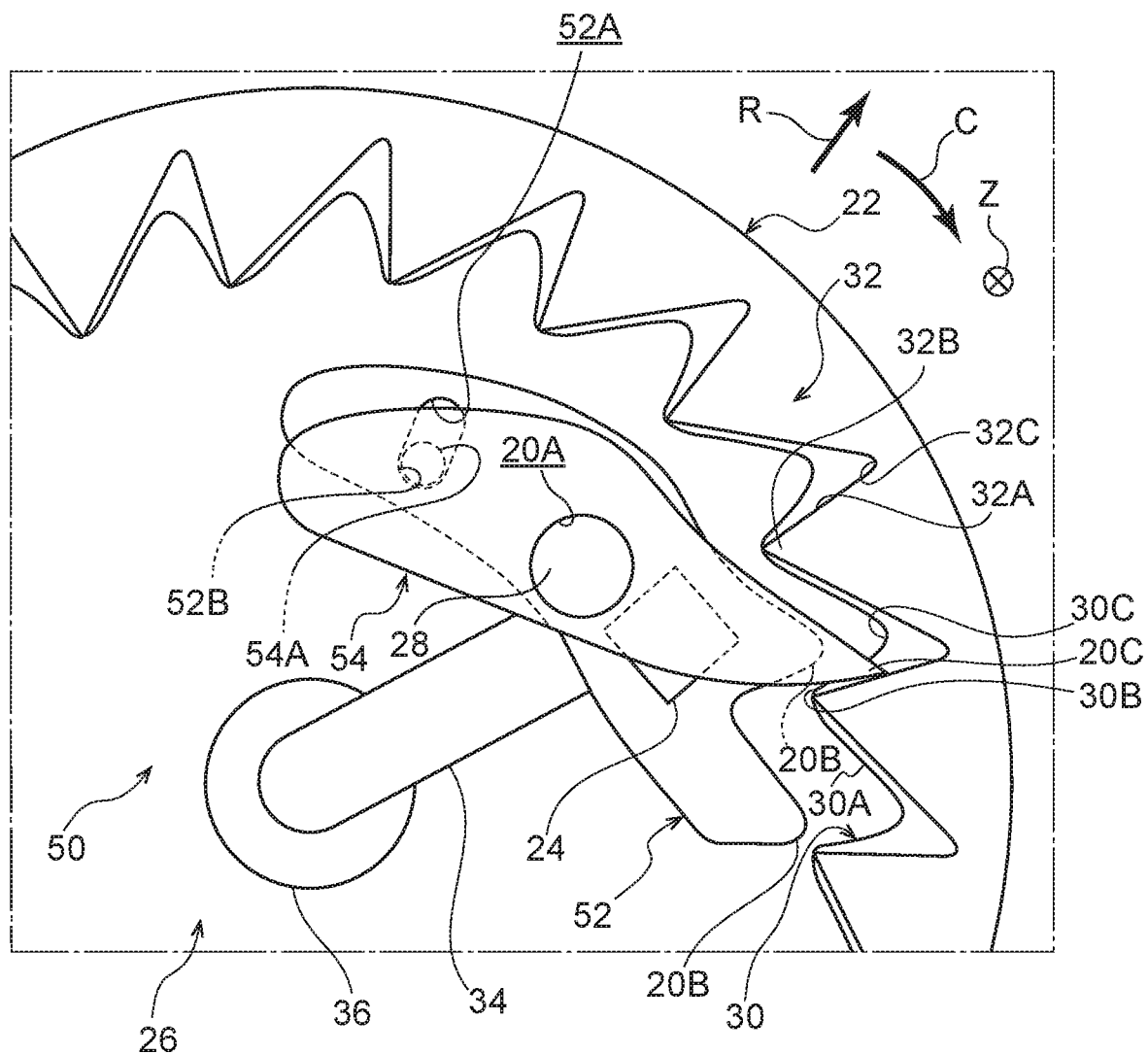
FIG. 17 is a side view corresponding to FIG. 14, illustrating a state in which the spool has rotated in the pull-out direction from the state illustrated in FIG. 16.
Figure 18:
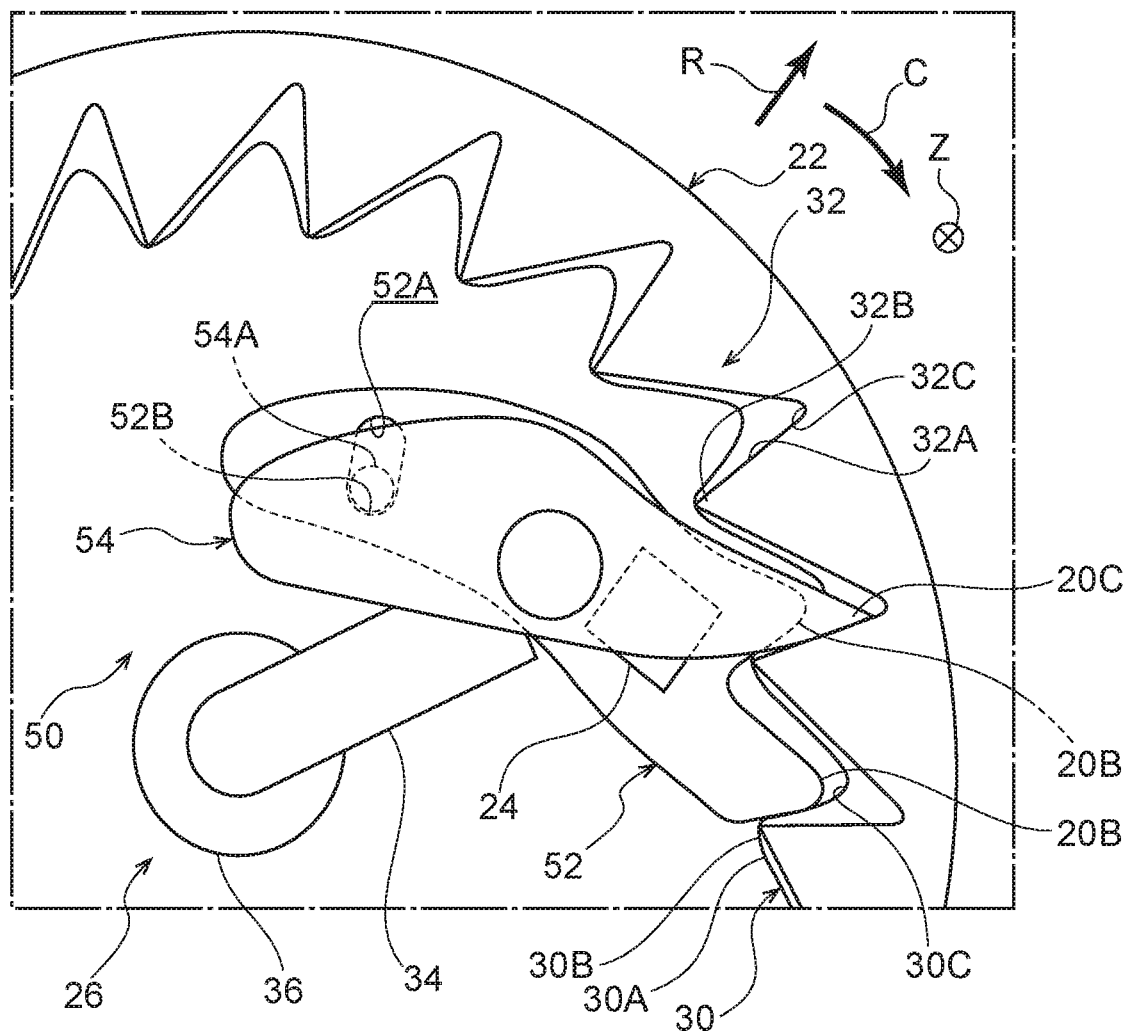
FIG. 18 is a side view corresponding to FIG. 14, illustrating a state in which the spool has rotated in the pull-out direction from the state illustrated in FIG. 17.

If the webbing 12 is pulled out further from the spool 14 after the sub engaging tooth 20C of the second rotatable locking section 54 and the leading end portion 32B of the sub engagement tooth 32A of the second fixed locking section 32 have contacted each other in the circumferential direction, the spool 14 is rotated further in the pull-out direction. When this occurs, as illustrated in FIG. 16 to FIG. 17, the sub engaging tooth 20C of the second rotatable locking section 54 moves along the sub engagement tooth 32A of the second fixed locking section 32. Accordingly, the second rotatable locking section 54 tilts further toward the fixed locking section 22 together with the first rotatable locking section 52, and the main engaging teeth 20B of the first rotatable locking section 52 move toward the terminal portions 30C of the corresponding main engagement teeth 30A of the first fixed locking section 30.

Figure 19:
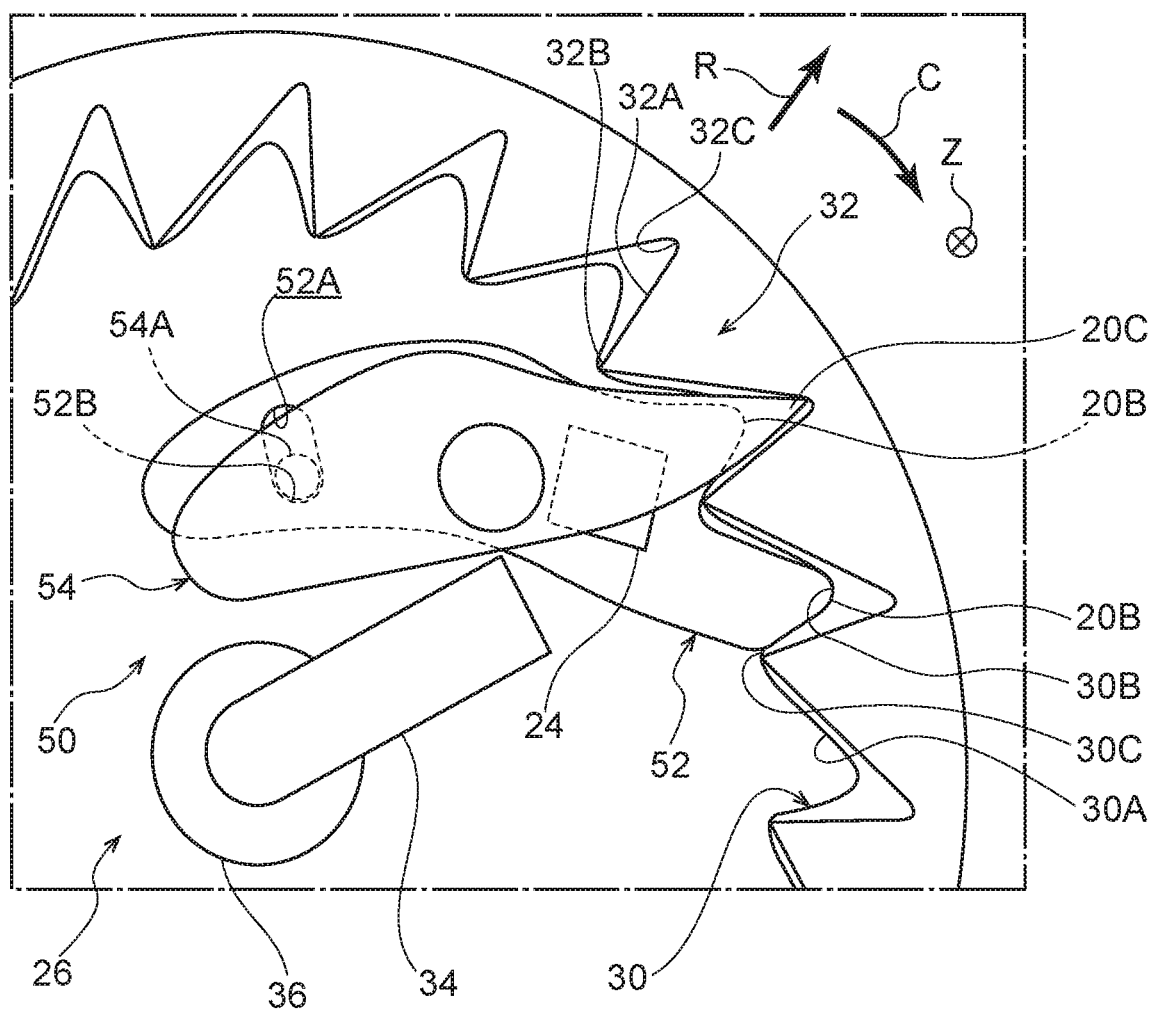
FIG. 19 is a side view corresponding to FIG. 14, illustrating a state in which the spool has rotated in the pull-out direction from the state illustrated in FIG. 18, and spool rotation is locked.

If the webbing 12 is pulled out yet further from the spool 14, the spool 14 is rotated further in the pull-out direction, and as illustrated in FIG. 19, the main engaging teeth 20B of the first rotatable locking section 52 contact the terminal portions 30C of the corresponding main engagement teeth 30A of the first fixed locking section 30. In this state, pull-out direction rotation of the spool 14 is locked, thus restricting pull-out of the webbing 12 from the spool 14. The body of the occupant is thus restrained by the webbing 12.

Note that in the present exemplary embodiment, the second rotatable locking section 54 tilts with respect to the first rotatable locking section 52, and the sub engaging tooth 20C of the second rotatable locking section 54 engages with the fixed locking section 22 (the second fixed locking section 32) before the main engaging teeth 20B of the first rotatable locking section 52 engage therewith. Accordingly, the impact when the rotatable locking section (the first rotatable locking section 52 and the second rotatable locking section 54) engages with the fixed locking section 22 can be dispersed between the first rotatable locking section 52 and the second rotatable locking section 54. This thereby enables the initial impact when the rotatable locking section (the first rotatable locking section 52 and the second rotatable locking section 54) engages with the fixed locking section 22 to be lessened. Damage to the rotatable locking section (the first rotatable locking section 52 and the second rotatable locking section 54) and the fixed locking section 22 can be suppressed as a result, enabling the durability of the locking mechanism 50 for locking rotation of the spool 14 to be improved.

The rotatable locking section has a divided structure configured of the first rotatable locking section 52 and the second rotatable locking section 54, thereby enabling the respective weights of the first rotatable locking section 52 and the second rotatable locking section 54 to be reduced in comparison to the rotatable locking section 20 (see FIG. 2) described above. This thereby enables the kinetic energy of the first rotatable locking section 52 and the second rotatable locking section 54 as the spool 14 is rotated to be reduced. This thereby enables the impact when the second rotatable locking section 54 engages with the second fixed locking section 32 to be lessened, and also enables the impact when the first rotatable locking section 52 engages with the first fixed locking section 30 to be lessened.

Since the impact when the rotatable locking section (the first rotatable locking section 52 and the second rotatable locking section 54) engages with the fixed locking section 22 can be lessened, the engaging teeth (the main engaging teeth 20B and the sub engaging tooth 20C) of the first rotatable locking section 52 and the second rotatable locking section 54 can be configured with more pointed shapes. This enables the respective engaging teeth to be suppressed from rebounding due to contact at the tips of the respective engaging teeth (the main engaging teeth 20B and the sub engaging tooth 20C). The respective engaging teeth (the main engaging teeth 20B and the sub engaging tooth 20C) can be engaged smoothly with the fixed locking section 22 (the first fixed locking section 30 and the second fixed locking section 32) as a result.

Moreover, in the present exemplary embodiment, only the second rotatable locking section 54, which is more lightweight than first rotatable locking section 52, is displaced by the electromagnet 26. This thereby enables an increase in the physical size of the electromagnet 26 (higher electromagnet output) to be suppressed. This enables the physical size of the webbing take-up device 10 to be made smaller as a result.

In the present exemplary embodiment, the rotatable locking section has a divided structure configured of the first rotatable locking section 52 and the second rotatable locking section 54. Appropriately setting the materials and dimensions, such as the axial direction thickness, of the first rotatable locking section 52 and the second rotatable locking section 54 enables the weights and strengths thereof to be easily set. Similarly, in the case of the first fixed locking section 30 and the second fixed locking section 32 that the first rotatable locking section 52 and the second rotatable locking section 54 respectively engage with, selecting the materials used for the first fixed locking section 30 and the second fixed locking section 32 enables the weights and strengths thereof to be adjusted easily. Note that the first fixed locking section 30 and the second fixed locking section 32 may be configured with an integral structure.

Explanation has been given regarding exemplary embodiments of the present invention. However, the present invention is not restricted to the above, and obviously various other modifications may be implemented within a range not departing from the spirit of the present invention.

What is claimed is:

1. A webbing take-up device comprising:
    a spool that takes up a webbing worn by an occupant and that is rotated in a pull-out direction by the webbing being pulled out;
    a rotatable locking section that is provided so as to be rotatable as a unit together with the spool and so as to be displaceable in a rotation-radial direction of the spool;
    a fixed locking section that is provided at an outer side of the rotatable locking section in the rotation-radial direction of the spool, and that the rotatable locking section engages with resulting in pull-out direction rotation of the spool being locked;
    a restricting section that restricts displacement of the rotatable locking section toward the fixed locking section; and
    a displacement section that is actuated in a vehicle emergency so as to displace the rotatable locking section toward the fixed locking section against the restriction of displacement of the rotatable locking section by the restricting section,
    a restricting force of the rotatable locking section by the restricting section being set such that the rotatable locking section is displaced toward the fixed locking section by an inertial force that spins the rotatable locking section about its own center of rotation when the displacement section is deactivated and the spool has been rotated in the pull-out direction with an angular acceleration greater than a predetermined angular acceleration, wherein
    the rotatable locking section is not displaced toward the fixed locking section when the displacement section is deactivated and the spool has been rotated in the pull-out direction with an angular acceleration equal to or less than the predetermined angular acceleration.

2. The webbing take-up device of claim 1, wherein:
    the restricting section and the displacement section include:
        a permanent magnet fixed to the rotatable locking section, and
        an electromagnet formed from a magnetic material and including a core disposed opposite the permanent magnet and a coil disposed around the core;
    displacement of the rotatable locking section toward the fixed locking section is restricted by a magnetic force of the permanent magnet attracting the core; and
    the rotatable locking section is displaced toward the fixed locking section by a current being passed through the coil in one direction such that a magnetic force of repulsion from the permanent magnet is generated in the core.

3. The webbing take-up device of claim 2, wherein displacement of the rotatable locking section toward the fixed locking section is restricted by a current being passed through the coil in another direction such that a magnetic force pulling on the permanent magnet is generated in the core.

4. The webbing take-up device of claim 3, wherein:
    current is passed through the coil in the other direction when the webbing is being pulled out from the spool as an occupant attempts to put on the webbing; and
    current stops being passed through the coil in a state in which the webbing is being worn by the occupant.

5. The webbing take-up device of claim 2, wherein:
    the core includes a shaft upper portion disposed on a rotation axis of the spool and is provided so as to be capable of rotating as a unit with the spool; and
    the coil is disposed around the shaft upper portion.

6. The webbing take-up device of claim 2, wherein:
    the rotatable locking section is displaced as far as a position where the rotatable locking section is capable of abutting the fixed locking section when current is being passed through the coil in the one direction; and
    engagement of the rotatable locking section and the fixed locking section with each other is completed by the spool being rotated in the pull-out direction in an abutted state of the rotatable locking section against the fixed locking section.

7. The webbing take-up device of claim 1, wherein:
    the fixed locking section includes a leading end portion that abuts the rotatable locking section at a rotation-radial direction inner side portion of the spool and a terminal portion that abuts the rotatable locking section at a rotation-radial direction outer side portion of the spool; and
    a hardness of the leading end portion is lower than a hardness of the terminal portion.

8. The webbing take-up device of claim 7, wherein:
    the fixed locking section includes a first fixed locking section and a second fixed locking section adjacent to each other in a rotation axis direction of the spool;
    the terminal portion is provided at the first fixed locking section; and
    the leading end portion is provided at the second fixed locking section.

9. The webbing take-up device of claim 1, wherein:
    the restricting section includes a biasing member that biases the rotatable locking section toward an opposite side from the fixed locking section;
    the displacement section includes an electromagnet including a coil and a moving member that moves when a current is passed through the coil; and
    a current being passed through the coil in one direction moves the moving member such that the rotatable locking section is pressed directly or indirectly by the moving member and the rotatable locking section is displaced toward the fixed locking section.

10. The webbing take-up device of claim 1, wherein:
    the rotatable locking section includes a first rotatable locking section and a second rotatable locking section disposed adjacent to the first rotatable locking section in a rotation axis direction of the spool;
    the second rotatable locking section is displaceable toward the outer side with respect to the first rotatable locking section in the rotation-radial direction of the spool; and
    the second rotatable locking section is displaced toward the outer side with respect to the first rotatable locking section in the rotation-radial direction of the spool, and the second rotatable locking section engages with the fixed locking section before the first rotatable locking section engages with the fixed locking section.

11. A webbing take-up device comprising:

a spool that takes up a webbing worn by an occupant and that is rotated in a pull-out direction by the webbing being pulled out;

a rotatable locking section that is provided so as to be rotatable as a unit together with the spool and so as to be displaceable in a rotation-radial direction of the spool;

a fixed locking section that is provided at an outer side of the rotatable locking section in the rotation-radial direction of the spool, and that the rotatable locking section engages with resulting in pull-out direction rotation of the spool being locked;

a restricting section that restricts displacement of the rotatable locking section toward the fixed locking section; and a displacement section that is actuated in a vehicle emergency so as to displace the rotatable locking section toward the fixed locking section against the restriction of displacement of the rotatable locking section by the restricting section, a restricting force of the rotatable locking section by the restricting section being set such that the rotatable locking section is displaced toward the fixed locking section by an inertial force that spins the rotatable locking section about its own center of rotation when the displacement section is deactivated and the spool has been rotated in the pull-out direction with an angular acceleration greater than a predetermined angular acceleration, wherein:

the restricting section and the displacement section include:
  a permanent magnet fixed to the rotatable locking section, and
  an electromagnet formed from a magnetic material and including a core disposed opposite the permanent magnet and a coil disposed around the core;

displacement of the rotatable locking section toward the fixed locking section is restricted by a magnetic force of the permanent magnet attracting the core; and the rotatable locking section is displaced toward the fixed locking section by a current being passed through the coil in one direction such that a magnetic force of repulsion from the permanent magnet is generated in the core.

12. A webbing take-up device comprising:

a spool that takes up a webbing worn by an occupant and that is rotated in a pull-out direction by the webbing being pulled out;

a rotatable locking section that is provided so as to be rotatable as a unit together with the spool and so as to be displaceable in a rotation-radial direction of the spool;

a fixed locking section that is provided at an outer side of the rotatable locking section in the rotation-radial direction of the spool, and that the rotatable locking section engages with resulting in pull-out direction rotation of the spool being locked;

a restricting section that restricts displacement of the rotatable locking section toward the fixed locking section; and a displacement section that is actuated in a vehicle emergency so as to displace the rotatable locking section toward the fixed locking section against the restriction of displacement of the rotatable locking section by the restricting section, a restricting force of the rotatable locking section by the restricting section being set such that the rotatable locking section is displaced toward the fixed locking section by an inertial force that spins the rotatable locking section about its own center of rotation when the displacement section is deactivated and the spool has been rotated in the pull-out direction with an angular acceleration greater than a predetermined angular acceleration, wherein:

the fixed locking section includes a leading end portion that abuts the rotatable locking section at a rotation-radial direction inner side portion of the spool and a terminal portion that abuts the rotatable locking section at a rotation-radial direction outer side portion of the spool; and a hardness of the leading end portion is lower than a hardness of the terminal portion.

* * * * *